US011978167B2

(12) United States Patent
Kuno et al.

(10) Patent No.: US 11,978,167 B2
(45) Date of Patent: May 7, 2024

(54) HEAD-MOUNTED DISPLAY

(71) Applicant: Hitachi-LG Data Storage, Inc., Tokyo (JP)

(72) Inventors: Takuma Kuno, Tokyo (JP); Toshiteru Nakamura, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 61 days.

(21) Appl. No.: 17/863,552

(22) Filed: Jul. 13, 2022

(65) Prior Publication Data

US 2023/0083745 A1 Mar. 16, 2023

(30) Foreign Application Priority Data

Sep. 14, 2021 (JP) ................................. 2021-149510

(51) Int. Cl.
  *G06T 19/00* (2011.01)
  *F21V 8/00* (2006.01)
  *G02B 27/00* (2006.01)
  *G02B 27/01* (2006.01)
(52) U.S. Cl.
  CPC .......... *G06T 19/006* (2013.01); *G02B 6/0026* (2013.01); *G02B 6/0075* (2013.01); *G02B 27/0093* (2013.01); *G02B 27/0172* (2013.01); *G02B 2027/0138* (2013.01); *G02B 2027/0141* (2013.01); *G02B 2027/0174* (2013.01)

(58) Field of Classification Search
  CPC .......... G02B 27/0172; G02B 6/0026; G02B 6/0075; G02B 27/0093; G06T 19/006
  See application file for complete search history.

(56) References Cited

U.S. PATENT DOCUMENTS

2016/0282623 A1* 9/2016 Miyao ...................... G02B 5/26
2018/0203237 A1 7/2018 Shih et al.

FOREIGN PATENT DOCUMENTS

JP 2018-116261 A 7/2018

\* cited by examiner

*Primary Examiner* — Charles Tseng
(74) *Attorney, Agent, or Firm* — MATTINGLY & MALUR, PC

(57) ABSTRACT

The head-mounted display includes: an image display unit that generates an image to be displayed; and a first light guide plate and a second light guide plate which duplicate image light from the image display unit. Each of the first light guide plate and the second light guide plate includes a set of parallel main surfaces confining the image light with internal reflection, the first light guide plate includes an incident plane that reflects the image light to an inner side, and two or more emission/reflection planes from which the image light is emitted to the second light guide plate, the second light guide plate includes an input part that couples the image light transmitted from the first light guide plate to the inner side, and an output part from which the image light is emitted to a user's pupil.

17 Claims, 15 Drawing Sheets

HEAD-MOUNTED DISPLAY

CROSS-REFERENCE TO RELATED APPLICATION

The present application claims priority from Japanese application JP2021-149510, filed on Sep. 14, 2021, the contents of which is hereby incorporated by reference into this application.

BACKGROUND OF THE INVENTION

1. Field of the Invention

The present invention relates to a head-mounted display that is mounted on the head of a user and displays an image in a visual field.

2. Description of the Related Art

A wearable device such as the head-mounted display (hereinafter, also abbreviated as "HMD") is required to have not only display performance such as securement of good field of view and visibility of an image but also a structure that is small in size and weight and excellent in a mounting property. The HMD uses a light guide plate to realize an image display device provided with a see-through property. In addition, since the light guide plate duplicates and projects image light to a user, a wide eye-box (an area where the user can visually recognize the image) is realized. In addition, since the light guide plate causes image light to propagate to user's eyes by using optical confinement due to total internal reflection, there are characteristics in which reduction in thickness, size, and weight is realized.

As a prior art document in this technical field, JP 2018-116261 A is exemplified. JP 2018-116261 A discloses an HMD including a first light guide plate and a second light guide plate which duplicate image light from a projection unit. The first light guide plate includes an input unit that reflects the image light to an inner side, and a partial reflection plane that duplicates the image light and emits the image light to the second light guide plate. The second light guide plate includes a coupling unit that couples the image light transmitted from the first light guide plate to the inner side, and an output unit that duplicates and emits the image light to a user's pupil.

In JP 2018-116261 A, the first light guide plate and the second light guide plate are provided to realize a large viewing angle of a display image.

However, to realize a wider angle of view of a display image while realizing a reduction in thickness, size, and weight, it is necessary to increase a refractive index of a light guide plate material so that the light guide plate causes the image light to propagate at total internal reflection. Here, when the refractive index of the light guide plate material is increased, light absorption by the light guide plate is increased, particularly, on a blue wavelength side. Particularly, since a propagation path inside the light guide plate is long, emission efficiency on the blue wavelength side of the image light emitted from a reflection plane farthest from an incident plane deteriorates. Therefore, there is a problem that color unevenness occurs in the display image.

JP 2018-116261 A does not consider the color unevenness of the display image in accordance with the increase of the reflective index of the light guide plate material.

SUMMARY OF THE INVENTION

The invention has been made in consideration of such circumstances, and an object thereof is to provide an HMD capable of displaying an image with a wider angle of view and an image without color unevenness while realizing a reduction in thickness, size, and weight.

According to an aspect of the invention, there is provided a head-mounted display configured to display an image in a visual field of a user. The head-mounted display includes: an image display unit configured to generate an image to be displayed; and a first light guide plate and a second light guide plate configured to duplicate image light from the image display unit. Each of the first light guide plate and the second light guide plate includes a set of parallel main surfaces confining the image light with internal reflection. The first light guide plate includes an incident plane that reflects the image light to an inner side, and two or more emission/reflection planes from which the image light is emitted to the second light guide plate. The second light guide plate includes an input part that couples the image light transmitted from the first light guide plate to the inner side, and an output part from which the image light is emitted to a user's pupil. A reflectance of blue wavelength region in an emission/reflection plane farthest from the incident plane of the first light guide plate is higher than a reflectance in a green wavelength region and a red wavelength region.

According to the invention, it is possible to provide an HMD capable of displaying an image with a wider angle of view and an image without color unevenness while realizing a reduction in thickness, size, and weight.

DETAILED DESCRIPTION OF THE PREFERRED EMBODIMENTS

Hereinafter, examples of the invention will be described with reference to the accompanying drawings.

Example 1

Figure 1A:
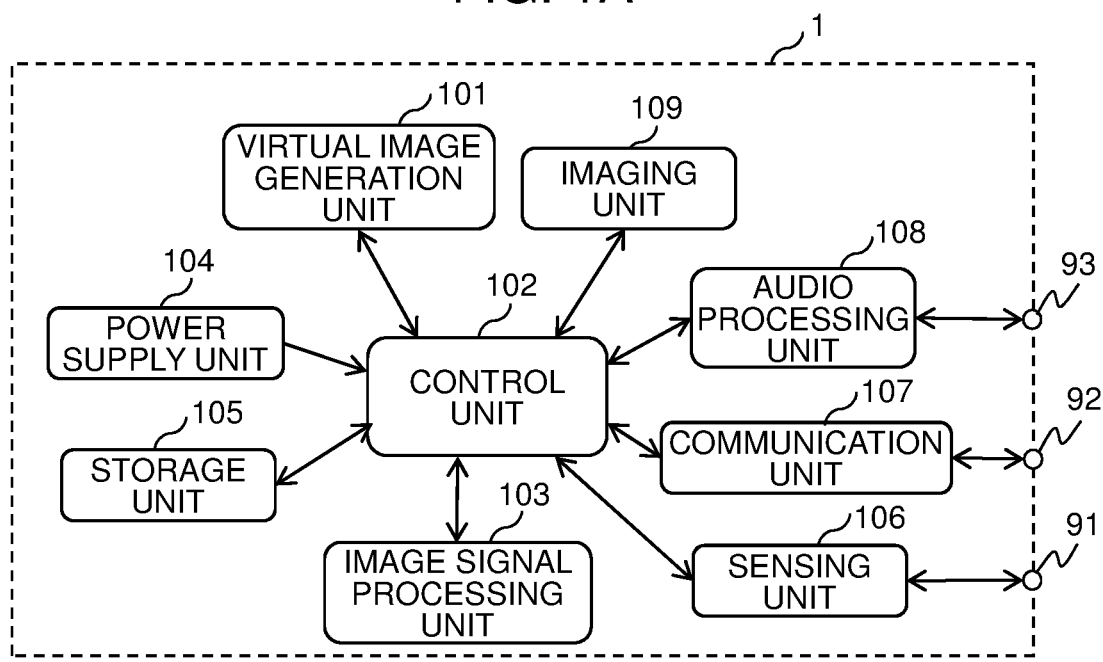
FIG. 1A is a functional block configuration diagram of an HMD in Example 1.

FIG. 1A is a functional block configuration diagram of an HMD in this example. In FIG. 1A, an HMD 1 includes a virtual image generation unit 101, a control unit 102, an image signal processing unit 103, a power supply unit 104, a storage unit 105, a sensing unit 106, a communication unit 107, an audio processing unit 108, an imaging unit 109, and input and output units 91 to 93.

The virtual image generation unit 101 enlarges and projects an image generated in a small-sized display unit to be described later as a virtual image, and displays an image of augmented reality (AR) or a mixed reality (MR) to a field of view of a wearer (user).

The control unit 102 collectively controls the entirety of the HMD 1. A function of the control unit 102 is realized by an operation device such as a CPU. The image signal processing unit 103 supplies an image signal for display to a display unit inside the virtual image generation unit 101. The power supply unit 104 supplies power to respective parts of the HMD 1.

The storage unit 105 stores information necessary for processing in the respective parts of the HMD 1 and information generated in the respective parts of the HMD 1. In addition, in a case where a function of the control unit 102 is realized by the CPU, the storage unit 105 stores a program executed by the CPU and data. For example, the storage unit 105 is constituted by a storage device such as a random access memory (RAM), a flash memory, a hard disk drive (HDD), and a solid state drive (SSD).

The sensing unit 106 is connected to various sensors through the input and output unit 91 that is a connector, and detects a posture (that is, a posture of a user, and a direction of the head of the user) and a movement of the HMD 1, an ambient temperature, and the like on the basis of a signal detected by the various sensor. As the various sensors, for example, an inclination sensor, an acceleration sensor, a temperature sensor, a sensor of a global positioning system (GPS) that detects position information of the user, and the like are connected.

The communication unit 107 performs communication with an external information processing device by short-range radio communication, long-range radio communication, or wired communication through the input and output unit 92 that is a connector. Specifically, communication is performed by Bluetooth (registered trademark), Wi-Fi (registered trademark), a mobile communication network, a universal serial bus (USB, registered trademark), a high-definition multimedia interface (HDMI (registered trademark)), or the like.

The audio processing unit 108 is connected to an audio input and output device such as a microphone, an earphone, and a speaker through the input and output unit 93 that is a connector, and performs input or output of an audio signal. For example, the imaging unit 109 is a small-sized camera or a small-sized time of flight (TOF) sensor, and images a direction of a field of view of the user of the HMD 1.

Figure 1B:
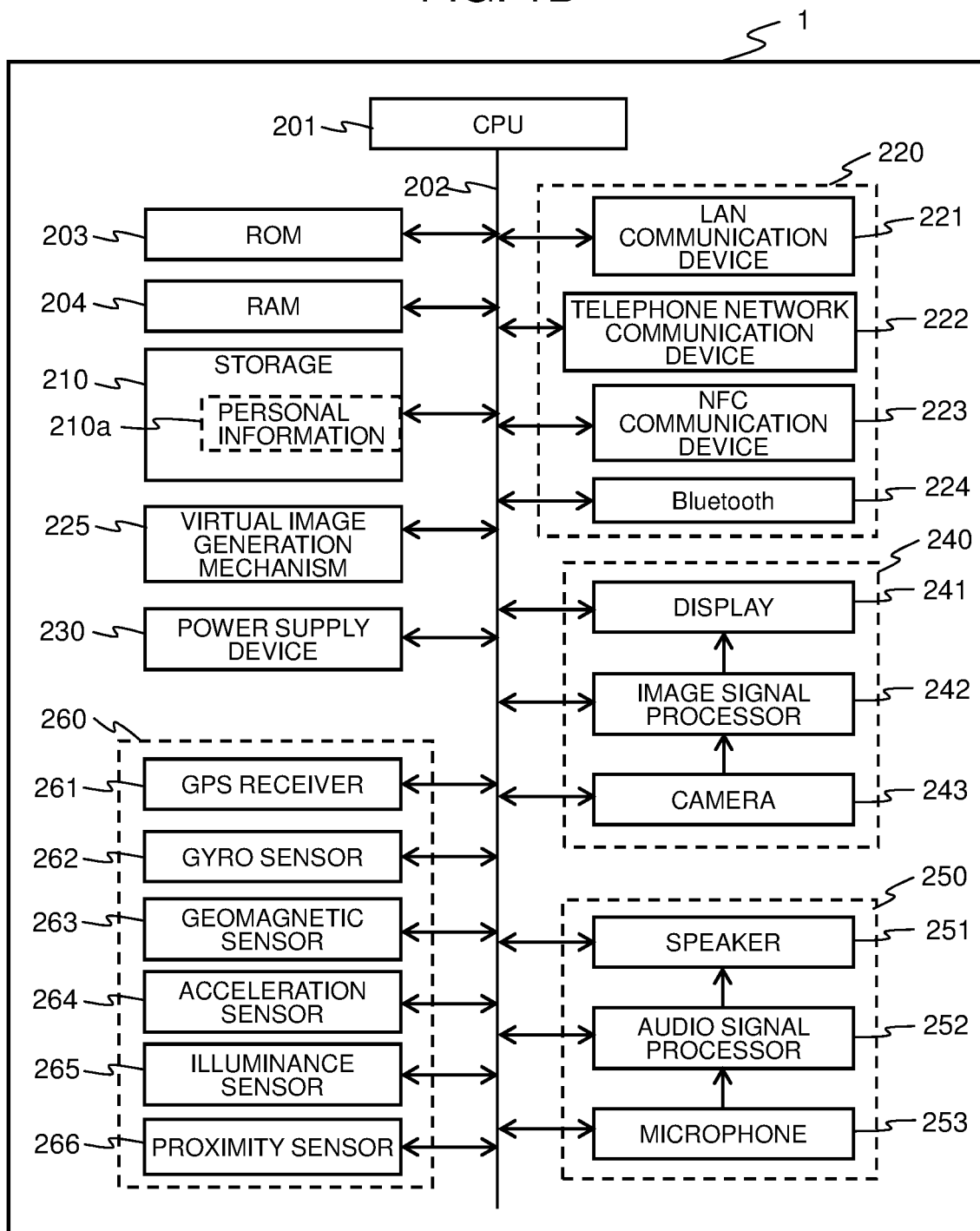
FIG. 1B is a block configuration diagram illustrating an example of a hardware configuration of the HMD illustrated in FIG. 1A.

FIG. 1B is a block configuration diagram illustrating an example of a hardware configuration of the HMD 1. As illustrated in FIG. 1B, the HMD 1 includes a CPU 201, a system bus 202, a read only memory (ROM) 203, a RAM 204, a storage 210, a communication processing device 220, a power supply device 230, a video processor 240, an audio processor 250, and a sensor 260.

The CPU 201 is a microprocessor unit that controls the entirety of the HMD 1. The CPU 201 corresponds to the control unit 102 in FIG. 1A. The system bus 202 is a data communication path for transmitting and receiving data between the CPU 201 and respective operation blocks in the HMD 1.

The ROM 203 is a memory that stores a basic operation program such as an operating system, and other operation programs, and for example, a rewritable ROM such as an electrically erasable programmable read-only memory (EEPROM) and a flash ROM can be used.

The RAM 204 becomes a work area when executing the basic operation program and the other operation programs. The ROM 203 and the RAM 204 may be integrated with the CPU 201. In addition, the ROM 203 may not have an independent configuration as illustrated in FIG. 1B, and may use a partial storage region in the storage 210.

The storage 210 stores an operation program or an operation setting value of the HMD 1, personal information 210a of a user who uses the HMD 1, and the like. Although not particularly exemplified below, the storage 210 may stores an operation program downloaded on a network, or various pieces of data created by the operation program. In addition, a partial storage region of the storage 210 may be substituted with a part or the entirety of a function of the ROM 203. As the storage 210, for example, a device such as a flash ROM, an SSD, and an HDD may be used. The ROM 203, the RAM 204, and the storage 210 correspond to the storage unit 105. Note that, the operation program stored in the ROM 203 or the storage 210 can be updated and functionally expanded by executing a download process from each device on a network.

The communication processing device 220 includes a local area network (LAN) communication device 221, a telephone network communication device 222, a near field communication (NFC) communication device 223, and a BlueTooth communication device 224. The communication processing device 220 corresponds to the communication unit 107 in FIG. 1A. FIG. 1B illustrates a case where the LAN communication device 221, the NFC communication device 223, and the BlueTooth communication device 224 are included in the communication processing device 220, but as illustrated in FIG. 1A, the devices may be connected as external devices of the HMD 1 through the input and output unit 92. The LAN communication device 221 is connected to a network through an access point, and transmits and receives data to and from a device on the network.

The NFC communication device 223 transmits and receives data through radio communication when a corresponding reader/writer is adjacent thereto. The BlueTooth communication device 224 transmits and receives data to and from an information processing device that is adjacent thereto through radio communication. Note that, the HMD 1 may include the telephone network communication device 222 that transmits and receives call and data to and from a base station of a mobile telephone communication network.

A virtual image generation mechanism 225 corresponds to the virtual image generation unit 101 in FIG. 1A. A specific configuration of the virtual image generation mechanism 225 will be described later with reference to FIG. 2.

The power supply device 230 is a power supply device that supplies power to the HMD 1 in a predetermined standard. The power supply device 230 corresponds to the power supply unit 104 in FIG. 1A. FIG. 1B illustrates a case where the power supply device 230 is included in the HMD 1, but the power supply device 230 may be connected as an external device of the HMD 1 through any of the input and output units 91 to 93 and the HMD 1 may be powered by the external device.

The video processor 240 includes a display 241, an image signal processing processor 242, and a camera 243. The image signal processing processor 242 corresponds to the image signal processing unit 103 in FIG. 1A. In addition, the camera 243 corresponds to the imaging unit 109 in FIG. 1A, and the display 241 corresponds to a small-sized display unit to be described later. FIG. 1B illustrates a case where the display 241 and the camera 243 are included in the video processor 240, but as illustrated in FIG. 1A, these devices may be connected as external devices of the HMD 1 through the input and output unit 93.

The display 241 displays image data processed by the image signal processing processor 242. The image signal processing processor 242 causes the display 241 to display image data that is input. The camera 243 is a camera unit that functions as an imaging device that inputs image data of the periphery or a target by converting light input from a lens into an electric signal by using an electronic device such as a charge coupled device (CCD) and a complementary metal oxide semiconductor (CMOS).

The audio processor 250 includes a speaker 251, an audio signal processor 252, and a microphone 253. The audio processor 250 corresponds to the audio processing unit 108 in FIG. 1A. FIG. 1B illustrates a case where the speaker 251 and the microphone 253 are included in the audio processor 250, but as illustrated in FIG. 1A, these devices may be connected as external devices of the HMD 1 through the input and output unit 93.

The speaker 251 outputs an audio signal that is processed by the audio signal processor 252. The audio signal processor 252 outputs input audio data to the speaker 251. The microphone 253 converts audio into audio data and outputs the audio data to the audio signal processor 252.

The sensor 260 is a sensor group for detecting a state of the HMD 1, and includes a GPS receiver 261, a gyro sensor 262, a geomagnetic sensor 263, an acceleration sensor 264, an illuminance sensor 265, and a proximity sensor 266. The sensor 260 corresponds to the sensing unit 106. FIG. 1B illustrates a case where the sensor 260 includes the GPS receiver 261, a gyro sensor 262, the geomagnetic sensor 263, the acceleration sensor 264, the illuminance sensor 265, and the proximity sensor 266, but as illustrated in FIG. 1A, the sensors may be connected as external devices of the HMD 1 through the input and output unit 91. The respective sensors correspond to a general sensor group that is known in the related art, and thus description thereof will be omitted. In addition, the configuration of the HMD 1 illustrated in FIG. 1B is illustrative only, and a part of the configuration may not be included.

Figure 2:
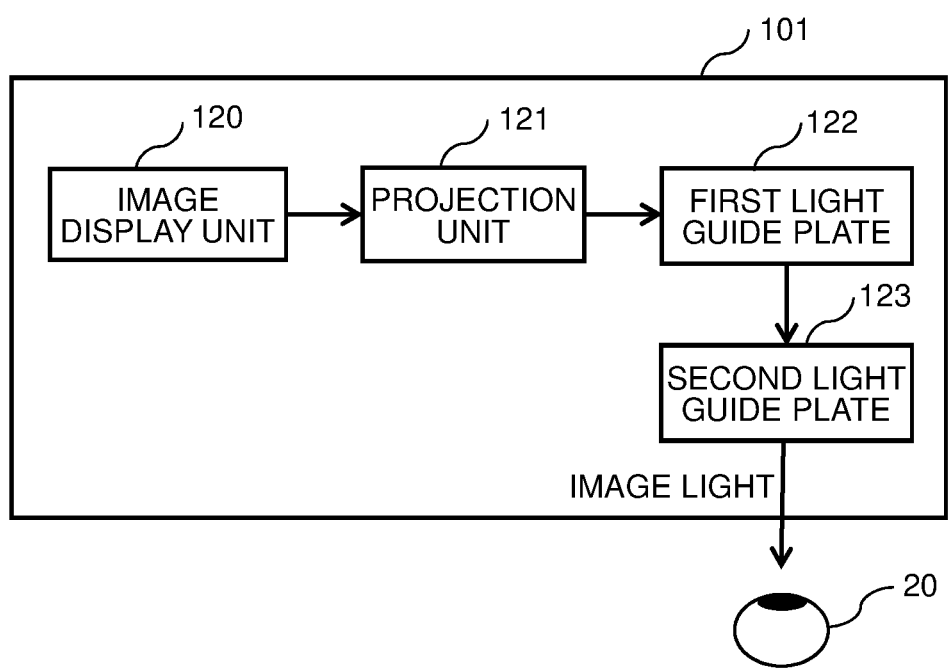
FIG. 2 is a block configuration diagram of a virtual image generation unit in Example 1.

FIG. 2 is a block configuration diagram of the virtual image generation unit 101 in this example. The virtual image generation unit 101 includes an image display unit 120, a projection unit 121, a first light guide plate 122, and a second light guide plate 123. The image display unit 120 is a device that generates an image to be displayed, and irradiates an embedded small-sized display unit with light transmitted from a light source such as an LED and a laser. The small-sized display unit is an element configured to display an image, and as the small-sized display unit, a liquid crystal display, a digital micromirror device, an organic EL display, a micro LED display, micro electro mechanical systems (MEMS), a fiber scanning device, or the like is used. The projection unit 121 is a device that includes a projection lens, and enlarges image light from the image display unit 120 and projects the image light as a virtual image. The first light guide plate 122 performs duplication of the image light for eye-box enlargement. The second light guide plate 123 performs image light duplication for eye-box enlargement in a direction different from the first light guide plate 122, and transfers image light transmitted from the projection unit 121 and the first light guide plate 122 to a user's pupil 20. When the image light imaged on a retina in the pupil 20, the user can visually recognize the image light.

Figure 3:
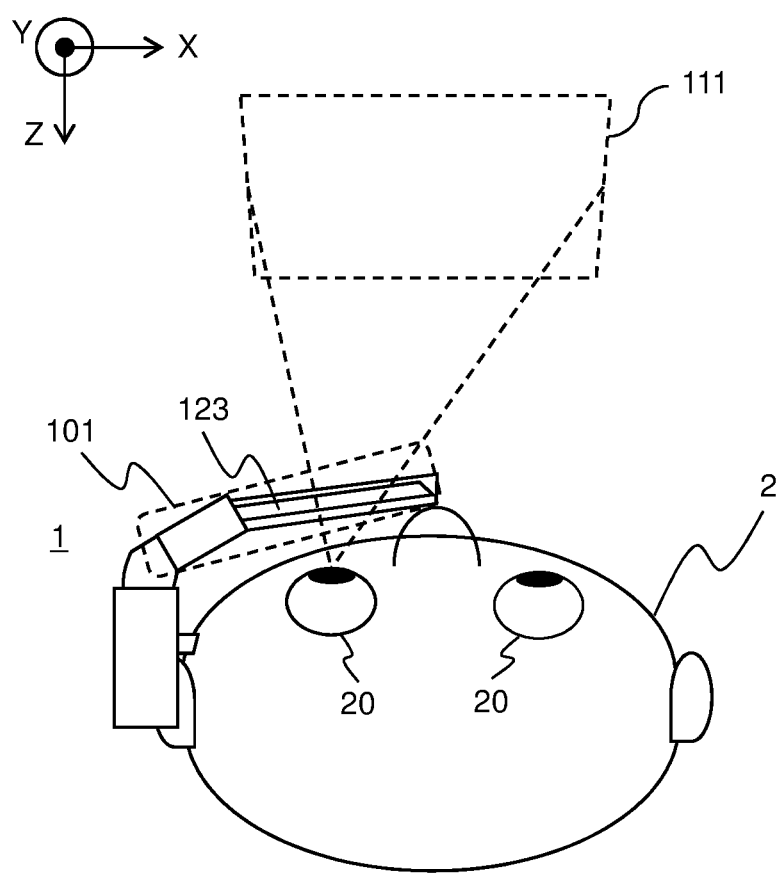
FIG. 3 is a view illustrating a usage aspect of the HMD in Example 1.

FIG. 3 is a view illustrating a usage aspect of the HMD 1 in this example. FIG. 3 illustrates a state when viewed from a head direction of a user 2. In the drawing, an X-axis represents a horizontal direction, a Y-axis represents a vertical direction, and a Z-axis represents a visual axis direction that is a line-of-sight direction of the user 2. In the following drawings, the directions of the X-axis, the Y-axis, and the Z-axis are defined in a similar manner.

As illustrated in FIG. 3, the HMD 1 is mounted on the head of the user 2, and causes image light generated in the virtual image generation unit 101 to propagate toward the user's pupil 20 through the second light guide plate 123. At this time, the user 2 can visually recognize an image (virtual image) in a partial image display region 111 in a visual field in a state (see-through type) capable of visually recognizing the outside. Note that, FIG. 3 illustrates a configuration in which an image is displayed on one eye, but a binocular configuration is also possible. In addition, the HMD 1 can also image a visual field range of the user 2 in the imaging unit 109 illustrated in FIG. 1A.

Figure 4:
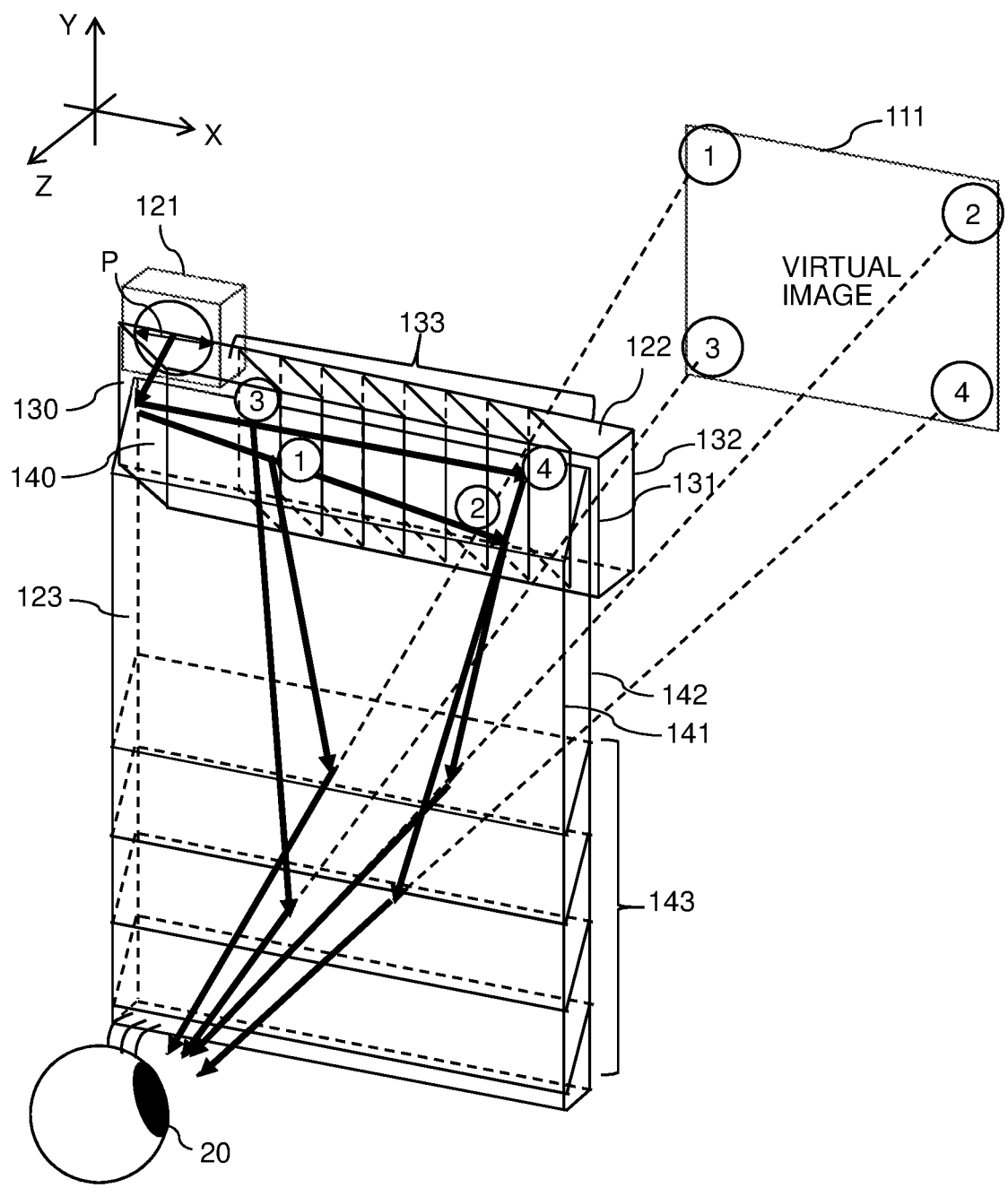
FIG. 4 is a configuration diagram of a first light guide plate and a second light guide plate in Example 1.

FIG. 4 is a configuration diagram of a first light guide plate and a second light guide plate in this example. An eye-box formed by the virtual image generation unit 101 is preferably enlarged in a two-dimensional direction from the viewpoint of visibility of an image. To two-dimensionally enlarge the eye-box, in FIG. 4, an eye-boxy in a horizontal direction is enlarged by the first light guide plate 122. The first light guide plate 122 includes an incident plane 130 that reflects image light to the inside of the first light guide plate 122, main surfaces 131 and 132 which are two main parallel surfaces confining the image light through total internal reflection that becomes internal reflection, and a group (hereinafter, referred to as "emission/reflection plane group") 133 including two or more emission/reflection surfaces from which the internal image light is emitted to the outside of the first light guide plate. The second light guide plate 123 includes an incident plane 140 (input part) that reflects the image light to the inside of the second light guide plate 123, main surfaces 141 and 142 which are two main parallel surfaces confining the image light through total internal reflection, and an emission/reflection plane group 143 (output part) from which the image light on an inner side is emitted to the outside of the second light guide plate 123. The second light guide plate 123 emits an image toward the user's pupil 20. In this manner, in the virtual image generation unit 101 in this example, the first light guide plate 122 and the second light guide plate 123 include a set of parallel main surfaces 131, 132, 141, and 142 which confine the image light through internal reflection, the first light guide plate 122 includes the incident plane 130 that reflects the image light to the inside, and the emission/reflection plane group 133 including two or more emission/reflection planes from which the image light is emitted to the second light guide plate 123, the incident plane 130 and the emission/reflection plane group 133 are parallel to each other and have different angles from the main surfaces, and the second light guide plate 123 includes the incident plane 140 (input part) that couples the image light transmitted from the first light guide plate 122 to an inner side and an emission/reflection plane group 143 (output part) from which the image light is emitted to the user's pupil 20.

The emission/reflection plane group 133 of the first light guide plate 122 and the emission/reflection plane group 143 of the second light guide plate 123 are partial reflection planes which reflect a part of light, and through which the part of light is transmitted or which absorbs the part of light, and the partial reflection planes are arranged in an array shape. An arrangement direction of the emission/reflection plane group 133 of the first light guide plate 122, and an arrangement direction of the emission/reflection plane group 143 of the second light guide plate 123 are different from each other to realize two-dimensional enlargement of the eye-box. Accordingly, an optical diameter P of the image display unit 120 and the projection unit 121 can be reduced (F value can be enlarged), and thus a significant reduction in size of the virtual image generation unit 101 is realized.

The emission/reflection planes included in the emission/reflection plane group 133 of the first light guide plate 122 are preferably parallel to each other so that an angle deviation does not occur in the reflected image light from the viewpoint of image quality. Similarly, in the emission/reflection plane group 143 of the second light guide plate 123, respective surfaces are preferably parallel to each other. When parallelism is lowered, a light beam angle after reflection in the emission/reflection plane groups 133 or 143 becomes different in each reflection plane, and thus stray light occurs and image quality deteriorates.

In addition, when the incident plane 130 and the emission/reflection plane group 133 of the first light guide plate 122 are parallel to each other, a processing process is simplified and the manufacturing cost can be reduced. When flat plates formed from respective reflective films are stacked and integrally bonded, and the resultant integral body is cut out, processing from an incident plane to an emission/reflection plane can be collectively performed, and a plurality of sheets of first light guide plates can be cut out. In a case where an angle of the incident plane 130 is different, it is necessary to form the incident plane after a process of cutting a light guide plate and cutting the incident plane at a predetermined angle. Since the incident plane 140 and the emission/reflection plane group 143 of the second light guide plate 123 are also parallel to each other, and thus processing is simplified and the cost can be suppressed.

In addition, in FIG. 4, rough optical paths of an angle of view at four corners of a display image (virtual image) are indicated by bold arrows. Light on a left side (Position 1 and Position 3) of the angle of view propagates from an emission/reflection plane on a side close to the incident plane 130 of the first light guide plate 122 to the pupil 20, and light on a right side (Position 2 and Position 4) of the angle of view propagates from an emission/reflection plane on a side far away from the incident plane 130 of the first light guide plate 122 to the pupil 20. In addition, light on an upper side (Position 1 and Position 2) of the angle of view propagates from an emission/reflection plane on a side close to the incident plane 140 of the second light guide plate 123 to the pupil 20, and light on a lower side (Position 3 and Position 4) of the angle of view propagates from an emission/reflection plane far away from the incident plane 140 of the second light guide plate 123 to the pupil 20.

As described above, in the first light guide plate 122 and the second light guide plate 123, as illustrated in FIG. 4, since the image light emitted from the first light guide plate 122 is received by the second light guide plate 123, the main surfaces 131 and 132 of the first light guide plate 122 and the main surfaces 141 and 142 of the second light guide plate 123 are disposed on a side closer to the projection unit 121 exist in planes different from each other, and the main surfaces 131 and 132 of the first light guide plate 122 are disposed on a side closer to the projection unit 121 in comparison to the main surfaces 141 and 142 of the second light guide plate 123, and the two main surfaces 131 and 132, and the two main surfaces 141 and 142 are disposed in parallel, respectively. In addition, it is necessary for the first light guide plate 122 and the second light guide plate 123 to be adjacent to each other so that the incident plane 140 of the second light guide plate 123 efficiently receives the image light emitted from the main surface 131 of the first light guide plate 122.

Next, description will be given of a refractive index of a light guide plate material. The light guide plate causes image light to propagate through total internal reflection. Accordingly, an angle of view of the image light capable of propagating through the light guide plate is limited to a threshold angle that is determined by the refractive index of the light guide plate material. When increasing the refractive index of the light guide plate material, the threshold angle decreases, and thus it is possible to cause image light having a wider angle of view to propagate. In addition, when increasing the refractive index of the light guide plate material, spreading of light is suppressed, and thus there is an advantage that a reduction in size and weight of the light guide plate can be realized.

However, in a case of a material with a high refractive index, optical absorption further increases in comparison to a material such as BK7 that is typically used. In addition, the optical absorption by the material with a high refractive index increases as a wavelength becomes short, and is large, particularly, on a blue wavelength side. According to this, in the light guide plate formed from the material with a high refractive index, particularly, a propagation path inside the light guide plate is long and a blue wavelength side emission efficiency of image light emitted from a reflection plane farthest from an incident plane deteriorates. Accordingly, there is a problem that color unevenness occurs in a display image.

Figure 5A:
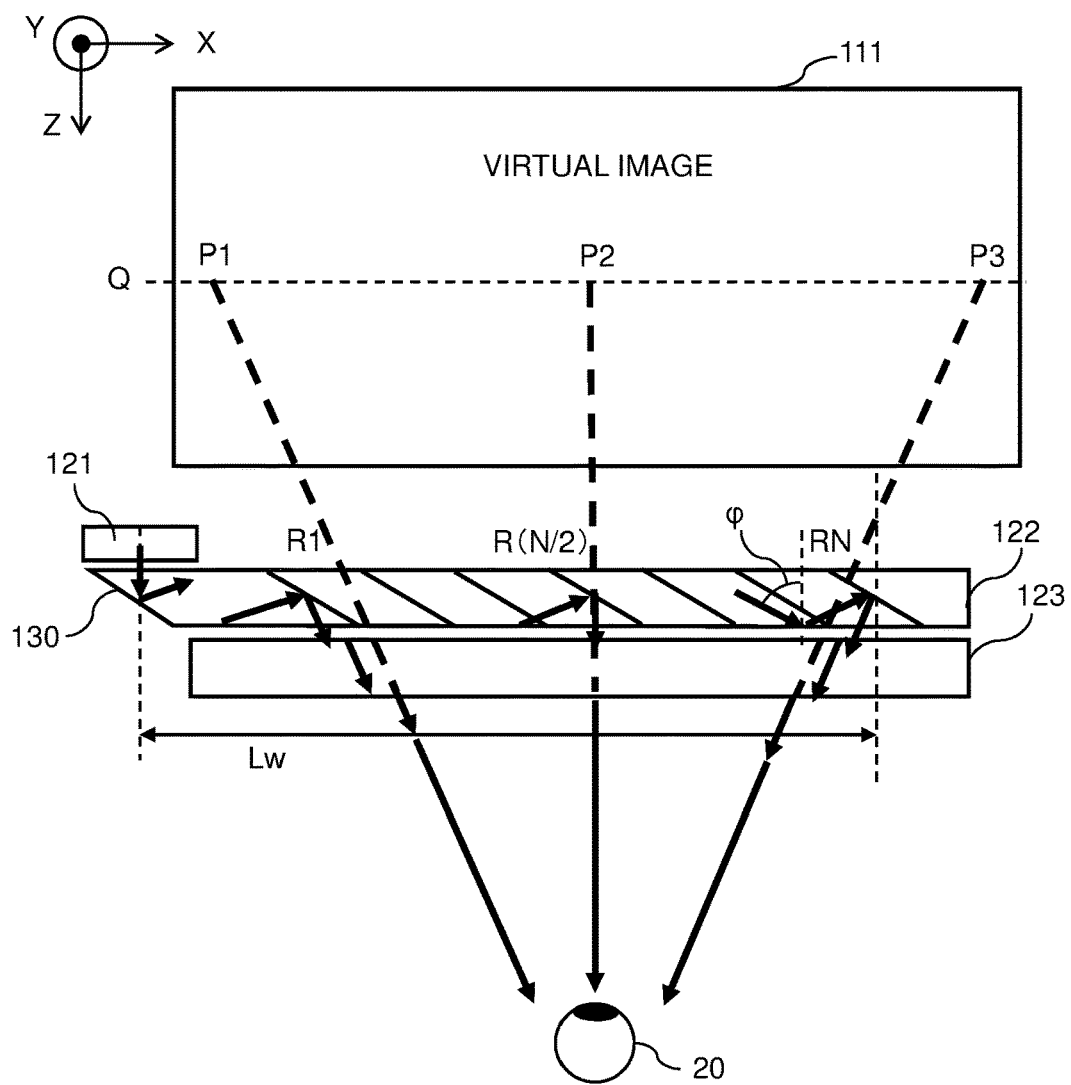
FIG. 5A is a view for describing an optical path of a virtual image for explaining an object in Example 1.
Figure 5B:
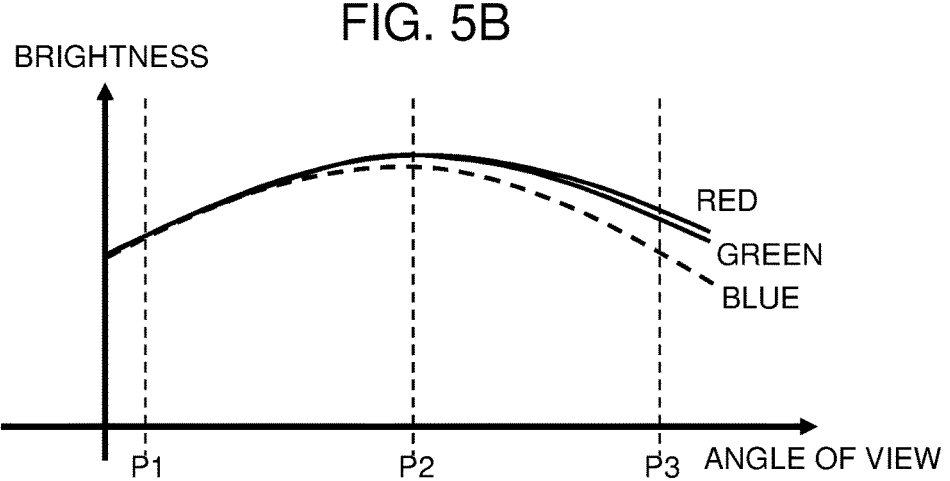
FIG. 5B is a view for describing a brightness distribution of the virtual image for explaining the object in Example 1.

Details of the problem will be described with reference to FIG. 5A and FIG. 5B. FIG. 5A illustrates the virtual image generation unit 101 when viewed from an upper side, a virtual image that is displayed by the virtual image generation unit 101, and optical paths corresponding to respective angles of view P1, P2, and P3. Here, P1, P2, and P3 are angles of view of a left end, the center, and a right end of the image display region 111. FIG. 5B illustrate brightness at a dotted line Q of the virtual image in FIG. 5A.

Image light beams corresponding to the angles of view P1, P2, and P3 of the virtual image of FIG. 5A are respectively reflected from emission/reflection planes R1, R(N/2), and RN of the first light guide plate 122, respectively, and propagate to the pupil 20. Here, the emission/reflection plane group of the first light guide plate 122 includes N sheets of emission/reflection planes, and the emission/reflection planes are set as R1 to RN (N is an integer) from a side close to the incident plane 130.

A virtual image at the angle-of-view left end P1 in FIG. 5A is light that is reflected from the emission/reflection plane P1 and propagates to the pupil 20. In light reflected from the emission/reflection plane R1, a propagation distance through the inside of the first light guide plate 122 is shorter and is less affected by absorption by a material of the first light guide plate 122 in comparison to light reflected from the other emission/reflection planes. Accordingly, a difference in the brightness of the virtual image is small between red, green, and blue as in P1 in FIG. 5B.

A virtual image at the angle-of-view center P2 in FIG. 5A is light that is reflected from the emission/reflection plane R(N/2) disposed at the center in the emission/reflection plane group of the first light guide plate 122, and propagates to the pupil 20. In the light reflected from the emission/reflection plane R(N/2), a propagation distance through the inside of the first light guide plate 122 further increases in comparison to the angle-of-view left end P1. Accordingly, the light is affected by optical absorption by the material. Optical absorption by a material with a high refractive index increases as a wavelength becomes shorter, and the optical absorption is large, particularly, in a blue wavelength region, and thus emission efficiency of the blue wavelength region deteriorates. As a result, the brightness of the blue wavelength region further decreases in comparison to the brightness of a red wavelength region and a green wavelength region as in P2 in FIG. 5B.

A virtual image of the angle-of-view right end P3 in FIG. 5A is light that is reflected from the emission/reflection plane RN and propagates to the pupil 20. The light is light that is emitted after being reflected from the emission/reflection plane RN disposed on the farthest side from the incident plane, that is, on the deepest side among the emission/reflection planes of the light guide plate, and a propagation distance through the inside of the first light guide plate 122 is the largest within the angles of view. Accordingly, an influence of optical absorption by the material appears most significantly. As a result, as illustrated in P3 in FIG. 5B, the brightness of the blue wavelength region further decreases in comparison to the brightness of the red wavelength region and the green wavelength region, and color unevenness appears most significantly.

As described above, the longer the propagation path inside the light guide plate from the incident plane of the light guide plate, that is, the deeper from the incident plane, the further an influence of optical absorption by the light guide plate material increases. As a result, the brightness of blue becomes smaller than that of red as going toward a right side of the angle of view as in FIG. 5B, and thus color unevenness occurs in a display image. Hereinafter, a solution to the problem will be described.

Figure 6A:
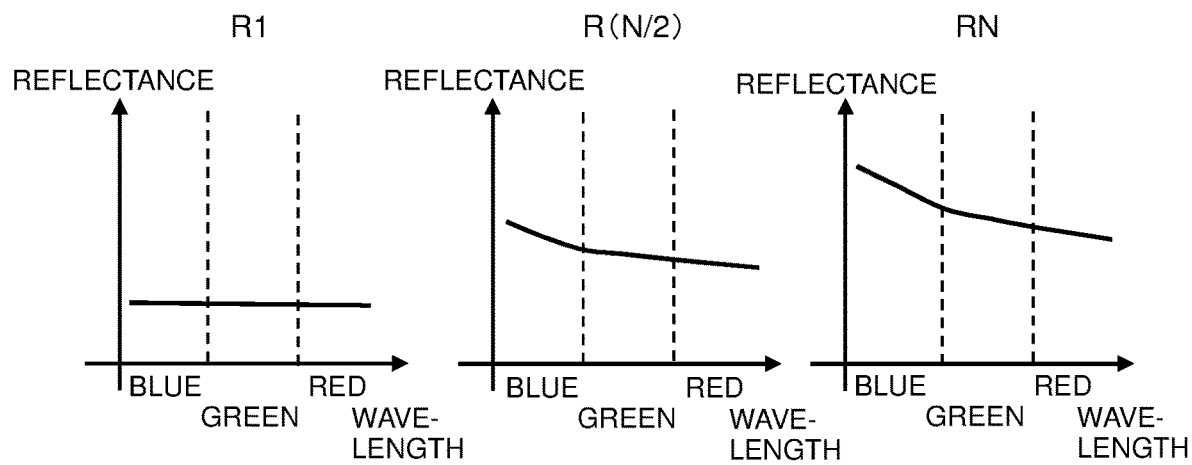
FIG. 6A is a view for describing a wavelength characteristic of a reflectance of an emission/reflection plane of the first light guide plate in Example 1.
Figure 6B:
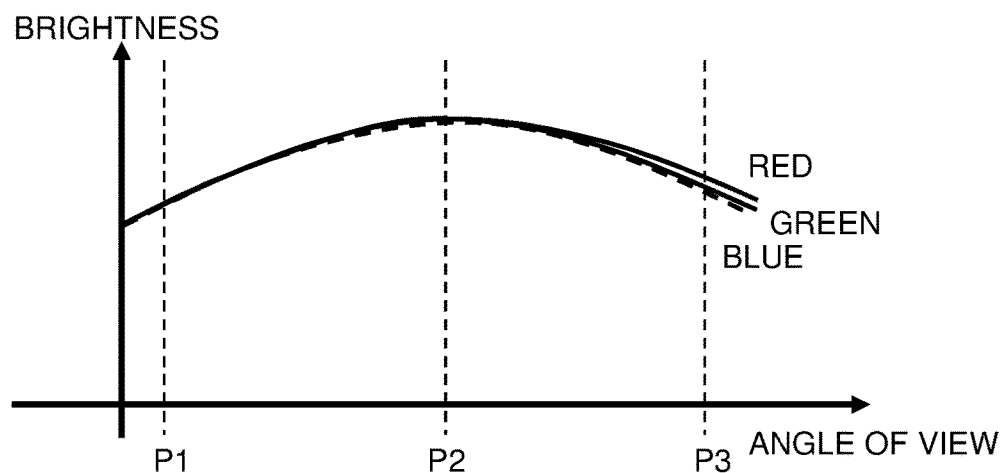
FIG. 6B is a view for describing a brightness distribution of the virtual image in Example 1.

A solution to the color unevenness that occurs in the first light guide plate 122 in this example will be described with reference to FIG. 6A and FIG. 6B. FIG. 6A illustrates a wavelength characteristic of a reflectance of each of the emission/reflection planes R1, R(N/2), and RN. FIG. 6B illustrates the brightness at a dotted line Q of the virtual image in FIG. 5A in a case of using this solution.

As described above, as light is emitted after being reflected from an emission/reflection plane located at a position farther from the incident plane 130, the propagation distance inside the light guide plate becomes longer, and thus the influence of absorption by the light guide plate material becomes large. Therefore, it is possible to improve the color unevenness by determining the wavelength characteristic of the reflectance of the emission/reflection plane in consideration of the magnitude of optical absorption of the light guide plate material.

FIG. 6A illustrates an example of the wavelength characteristic of the reflectance of the emission/reflection planes R1, R(N/2), and RN by the solution. In the emission/reflection plane R1 from which image light of the angle-of-view left end P1 is emitted, since an influence due to absorption by a material is small, wavelength dependency can be substantially eliminated, and thus it is possible to emit the image light of the blue wavelength region, the green wavelength region, and the red wavelength region in an approximately uniform manner.

In the emission/reflection plane R(N/2) from which image light of the angle-of-view center P2 is emitted, a reflectance of the blue wavelength region is set to be higher than that of the green wavelength region and the red wavelength region in consideration of optical absorption by a material, and thus emission efficiency deterioration due to optical absorption by the light guide plate material is cancelled, and the color unevenness can be improved.

In addition, even in the emission/reflection plane RN from which image light of the right end P3 is emitted, similarly, the reflectance of the blue wavelength region is set to be higher than the reflectance of the green wavelength region and the red wavelength region, and thus emission efficiency deterioration due to optical absorption by the light guide plate material is cancelled, and the color unevenness can be improved. The emission/reflection plane RN is disposed at a position farther from the incident plane 130 in comparison to the emission/reflection plane R(N/2), and thus a propagation distance through the first light guide plate 122 is larger, and is further affected by optical absorption by the light guide plate material. Therefore, a ratio of the reflectance of the blue wavelength region and the reflectance of the red wavelength region (the reflectance of the blue wavelength region/the reflectance of the red wavelength region) is further enlarged in comparison to the emission/reflection plane R(N/2) to further improve the color unevenness. Note that, in FIG. 6A, the reason why an absolute value of the reflectance of the emission/reflection plane RN is set to be larger in comparison to an absolute value of the reflectance of the emission/reflection planes R1 and R(N/2) is as follows. In the emission/reflection plane RN, light transmitted through the emission/reflection planes R1 and R(N/2) is incident thereto, and thus the quantity of light is further reduced in comparison to the emission/reflection planes R1 and R(M/2). Therefore, the setting is made to cover the reduction.

In addition, the blue wavelength region, the green wavelength region, and the red wavelength region stated here preferably correspond to wavelength regions of three primary colors of a projector light source, and for example, the blue wavelength region is 380 to 480 nm, the green wavelength region is 480 to 580 nm, and the red wavelength region is 580 to 680 nm.

Note that, in FIG. 6A and FIG. 6B, the reflection characteristic of three sites including the emission/reflection planes R1, R(N/2), and RN has been described, but the color unevenness of the entirety of the angle of view can be improved by determining the reflection characteristic of another emission/reflection plane from the same viewpoint.

In summary, at least, when the reflectance of the blue wavelength region in the emission/reflection plane farthest from the incident plane of the first light guide plate is set to be higher than the reflectance of the green wavelength region and the red wavelength region, the color unevenness can be improved.

More preferably, in the emission/reflection plane farthest from the incident plane of the first light guide plate, when the reflectance of the blue wavelength region is set to be higher than the reflectance of the green wavelength region and the red wavelength region in comparison to the emission/reflection plane immediately before the farthest emission/reflection plane, the color unevenness of a wide angle of view can be improved.

In addition, in a case where the reflectance of the blue wavelength region is set to be higher than the reflectance of the green wavelength region and the red wavelength region in two or more emission/reflection plane, a ratio of the reflectance of the blue wavelength region and the reflectance of the red wavelength region, that is, (the reflectance of the blue wavelength region)/(the reflectance of the red wavelength region) is set to be larger as the emission/reflection plane is farther from the incident plane 130, and thus the color unevenness that increases in accordance with light propagation can be improved.

Next, a wavelength characteristic of a specific reflectance will be described. In a high reflective index material that is typically used as an optical component, a transmittance per a thickness of 10 mm is approximately 100% in the red wavelength region, but the transmittance is 99% to 95% in the blue wavelength region.

In a case where the image light is incident to the light guide plate, and is emitted after being reflected from an emission/reflection plane disposed on the deepest side of the light guide plate, when calculating a length of an optical path along which the image light propagates through the light guide plate, $L_w/\sin \phi$ (Expression (1)) can be written by using a distance $L_w$ between the incident plane 130 of the light guide plate and an emission/reflection plane farthest from the incident plane 130, and a total internal reflection angle $\phi$ in propagation with total internal reflection as illustrated in FIG. 5A.

The distance $L_w$ to the emission/reflection plane farthest from the incident plane 130 of the light guide plate is 20 to 60 mm as a size of a typical light guide plate. In a case where image light is emitted after being reflected from an emission/reflection plane disposed on the deepest side of the light guide plate, since the image light propagates at a total internal reflection angle close to a threshold angle, the total internal reflection angle $\phi$ is within a range of approximately 30° to 40°. As described above, in a case where the image light is incident to the light guide plate and is emitted after being reflected from the emission/reflection plane disposed on the deepest side of the light guide plate, a length of an optical path along which the image light propagates through the light guide plate becomes 30 to 120 mm as the widest range from Expression (1).

In a high reflective index material that is typically used as an optical component, a transmittance t per a thickness of 10 mm is 95% to 99% in the blue wavelength region. In a case where the image light is incident to the light guide plate and is emitted after being reflected from the emission/reflection plane disposed on the deepest side of the light guide plate, a transmittance T of the blue wavelength region in the image light can be calculated by Expression of $T=t^{(S \div 10 \text{ mm})}$, and the transmittance T becomes 50% to 96%. Accordingly, when setting the reflectance of the blue wavelength region to be higher than the reflectance of approximately 100% in the red wavelength region by a range of approximately 1.0 to 2.0 times, the color unevenness is improved.

In the reflectance characteristic illustrated in FIG. 6A, it is assumed that the reflectance of the emission/reflection plane R1 has almost no wavelength dependency, but it is difficult to realize the reflectance characteristic having almost no wavelength dependency from the viewpoint of manufacturing a reflective film. In addition, for the purpose of multi-layering and averaging dielectric substances having different wavelength dependency, when the dielectric substances for forming a reflection plane are formed in multi layers until different wavelength dependency almost disappears, the difficulty of manufacturing the reflective film becomes high, and time necessary for vapor deposition of the reflective film is lengthened, and thus the manufacturing cost of the light guide plate becomes high.

In addition, in the emission/reflection plane disposed on a side close to the incident plane 130 as in the emission/reflection plane R1, since an incident angle at which the image light is incident to the emission/reflection plane is larger in comparison to other emission/reflection planes, it is more difficult to realize the reflective characteristic having almost no wavelength dependency, and it is necessary for the dielectric substances to be further multi-layered. This problem becomes further significant when a display image is set to have a wide angle of view because the incident angle at the time of being incident to the emission/reflection plane also increases when the display image has the wide angle of view.

Figure 7A:
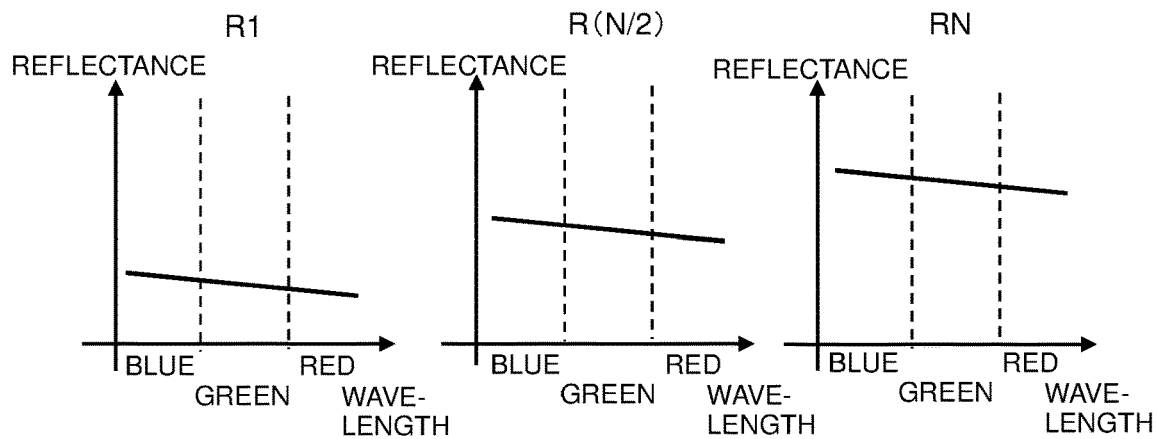
FIG. 7A is a view for describing another wavelength characteristic of the reflectance of the emission/reflection plane of the first light guide plate in Example 1.

Therefore, even when the reflective characteristic of the emission/reflection plane R1 is not set to the reflective characteristic having almost no wavelength dependency, the problem can be solved as follows. For example, as illustrated in FIG. 7A, the reflectance of the emission/reflection plane R1 is set to satisfy a reflective characteristic in which a reflectance decreases as a wavelength is enlarged as in a relationship of (reflectance of the blue wavelength region)>(reflectance of the green wavelength region)>(reflectance of the red wavelength region). In addition to this, a ratio of (reflectance of the blue wavelength region), (reflectance of the green wavelength region), and (reflectance of the red wavelength region) are set to be approximately the same as in the emission/reflection plane group 133. Note that, the reason why absolute values of the reflectance in the emission/reflection planes R1, R(N/2), and RN are different is because the quantity of emission light is made to be uniform with respect to a decrease in the quantity of incident light.

Figure 7B:
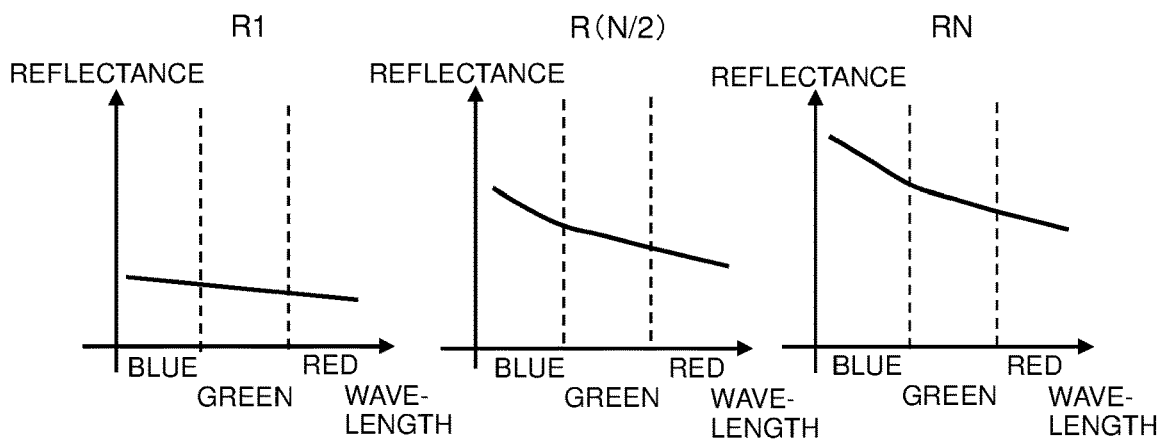
FIG. 7B is a view for describing a still another wavelength characteristic of the reflectance of the emission/reflection plane of the first light guide plate in Example 1.

In addition, as described with reference to FIG. 6A and FIG. 6B, in order to reduce color unevenness due to absorption of the blue wavelength region in the light guide plate, a ratio of the reflectance of the blue wavelength region and the reflectance of the red wavelength region, that is, (reflectance of the blue wavelength region)/(reflectance of the red wavelength region) is set to be higher as being farther from the incident plane 130. In this configuration, it is possible to reduce the color unevenness also in consideration of a decrease in emission efficiency of the blue wavelength region due to absorption of the blue wavelength region in the light guide plate. As an example, a reflectance characteristic in this case is illustrated in FIG. 7B.

Figure 7C:
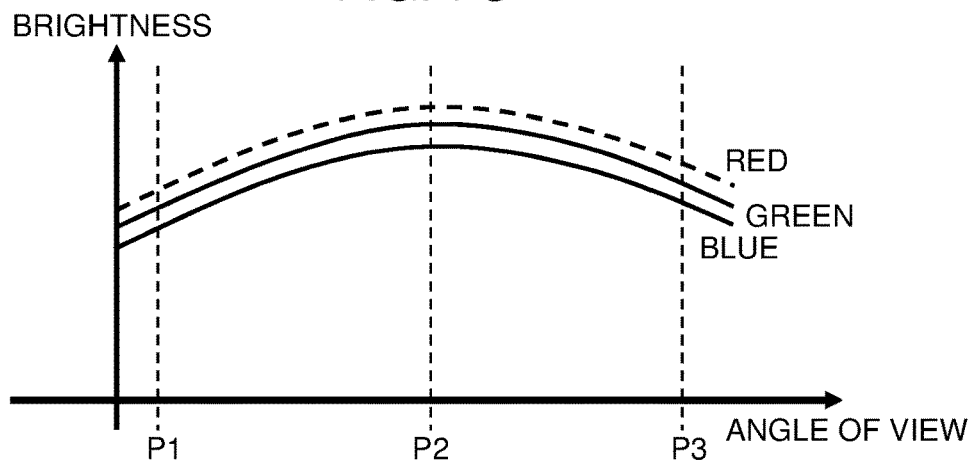
FIG. 7C is a view for describing another brightness distribution of the virtual image in Example 1.

In this case, as illustrated in FIG. 7C, even in an arbitrary angle of view of an image, a ratio of the brightness of the image light between the blue wavelength region, the green wavelength region, and the red wavelength region can be made to be constant, and the color unevenness can be reduced. Note that, when employing this reflectance characteristic, chromaticity of an image that is displayed by the image display unit 120, and chromaticity of an image that is finally emitted from the second light guide plate 123 and reaches the pupil 20 are different from each other. For example, in FIG. 7C, blue becomes strong in an image. Accordingly, it is necessary to adjust the chromaticity in the image display unit 120 in advance so that the chromaticity of the image reaching the pupil 20 has a desired value.

When employing the reflectance characteristic as described above, the difficulty of manufacturing a reflective film is greatly lowered, and it is possible to realize a light guide plate capable of displaying an image having no color unevenness for a user even in a non-expensive and thin reflective film.

Figure 8A:
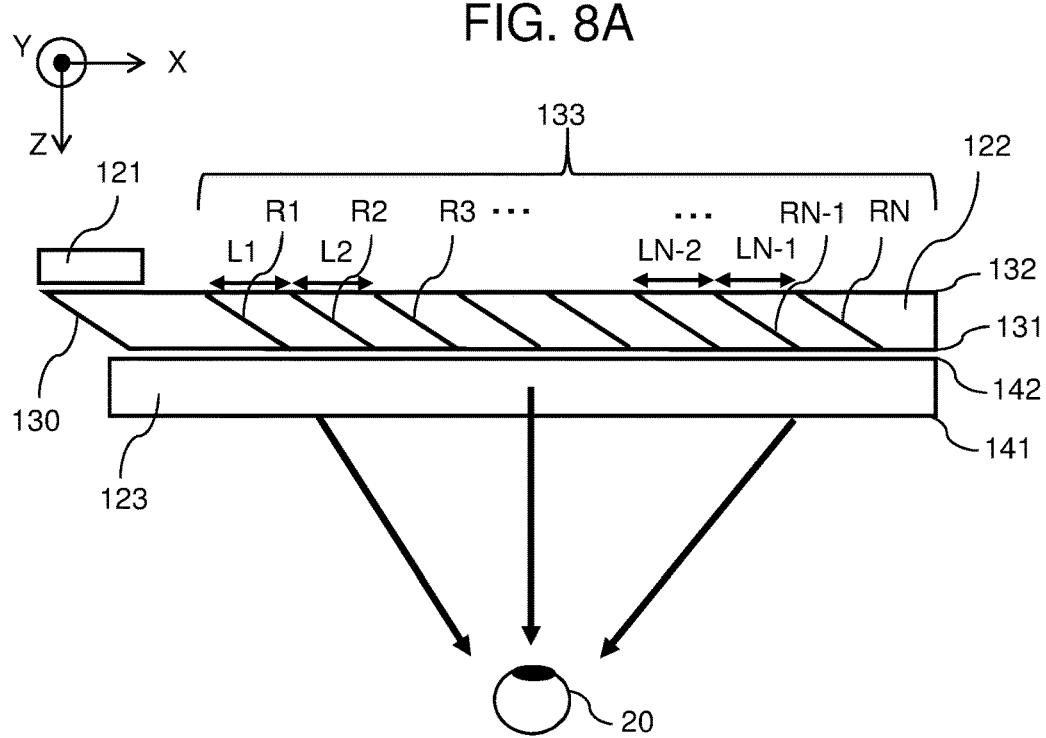
FIG. 8A is a top view for describing a detailed configuration of the first light guide plate and the second light guide plate in Example 1.
Figure 8B:
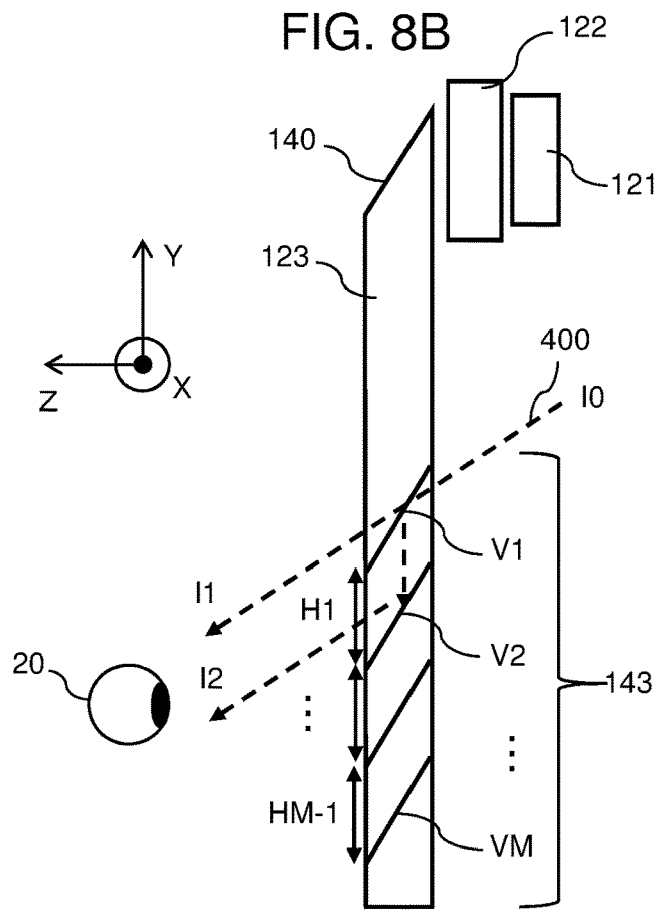
FIG. 8B is a side view for describing a detailed configuration of the first light guide plate and the second light guide plate in Example 1.

Next, description will be given of details of the configuration of the first light guide plate and the second light guide plate in this example with reference to FIG. 8A and FIG. 8B. FIG. 8A is a top view illustrating the first light guide plate 122 and the second light guide plate 123 in this example from an upper side of the Y-axis in a vertical direction, and FIG. 8B is a side view illustrating the first light guide plate 122 and the second light guide plate 123 in this example in a horizontal direction of the X-axis.

In this example, as illustrated in FIG. 8A, the emission/reflection plane group 133 of the first light guide plate 122 is constituted by N sheets of emission/reflection planes, and the N sheets of emission/reflection planes are set as R1 to RN (N is an integer) from a side close to the incident plane 130. In addition, intervals between the emission/reflection planes are set as L1 to LN−1 from a side close to the incident plane 130. In addition, as illustrated in FIG. 8B, the emission/reflection plane group 143 of the second light guide plate 123 is constituted by M sheets of emission/reflection planes, and the M sheets of emission/reflection planes are set as V1 to VM (M is an integer) from a side close to the incident plane 140. In addition, intervals of the emission/reflection planes are set as H1 to HM−1 from a side close to the incident plane 140.

Image light inside the first light guide plate 122 is gradually reflected from partial reflection planes of the emission/reflection plane group 133, propagates through the inside while the quality of light is reduced, and the entirety of the image light is finally emitted from a final plane RN of the emission/reflection plane group 133 to the second light guide plate 123. According to this, efficiency can be improved. Accordingly, when the emission/reflection planes of the emission/reflection plane group 133 have a configuration in which a reflectance gradually increases from a side close to the incident plane toward the final plane RN, uniformity in the quantity of light of the image light in the eye-box is improved.

Since the second light guide plate maintains a see-through property as the HMD, the reflectance of the emission/reflection plane group 143 becomes lower than the reflectance of the emission/reflection plane group 133. Since the reflectance is low, even when the reflectance of the emission/reflection plane group 143 is the same in each case (even in the same reflective film), large luminance evenness is not caused, and can be processed in the same film forming process, and thus the manufacturing cost can be reduced. Particularly, it is preferable that the reflectance of the emission/reflection plane group 143 of the second light guide plate is set to 10% or less from the viewpoint of securing luminance uniformity and the see-through property.

On the other hand, in a case of setting in which the reflectance is high with focus given to light usage efficiency rather than the see-through property, the reflective films of the emission/reflection plane group 143 may be set as films of which a reflectance is gradually increased from a side close to the incident plane to improve uniformity of the quantity of light in the image light within the eye-box and to improve image quality.

In a case where the plane intervals L1 to LN−1 of the emission/reflection plane group 133 of the first light guide plate 122, and the plane intervals H1 to HM−1 of the emission/reflection plane group 143 of the second light guide plate 123 are wider than the optical diameter P of the projection unit 121, overlapping between adjacent duplicated image light beams becomes insufficient, and thus an eye-box region in which the quantity of image light is less occurs. Therefore, when the plane intervals L1 to LN−1 of the emission/reflection plane group 133, and the plane intervals H1 to HM−1 of the emission/reflection plane group 143 of the second light guide plate 123 are set to smaller than the optical diameter P of the projection unit 121, luminance uniformity within the eye-box or a visually recognized image is improved.

Figure 9A:
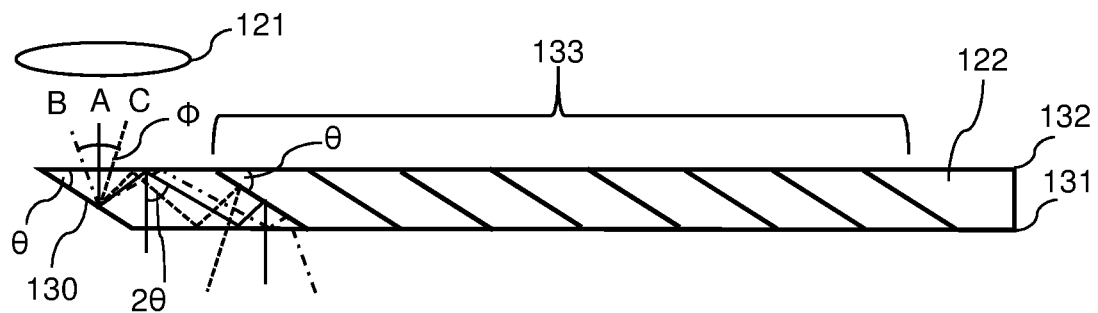
FIG. 9A is a view for describing a detailed configuration of the first light guide plate and the second light guide plate and an optical path in Example 1.

Next, detailed geometric conditions of an inclination angle θ of the emission/reflection planes and a total internal reflection threshold angle will be described with reference to FIG. 9A and FIG. 9B. The emission/reflection plane group 133 has a predetermined inclination angle θ with respect to the main surfaces 131 and 132 which are parallel planes to change a direction so as to emit image light to the outside of the light guide plate. In FIG. 9A, a solid line A represents a light beam at the center of an angle of view, and one-dotted chain line B and a two-dotted chain line C represent light beams at the end of the angle of view. The light beam A at the center of the angle of view is reflected from the incident plane 130 and proceeds at an incident angle 2θ with respect to the parallel main surfaces 131 and 132. In addition, in the light beams B and C, an incident angle with respect to the main surfaces 131 and 132 in the light guide plate is within a range of 2θ ±arcsin[sin(φ/2)/n] when considering refraction on the incident plane 130. It is necessary for the light beam B to satisfy the following expression from the viewpoint of avoiding stray light.

$$2\theta + \arcsin[\sin(\theta/2)/n] < 90° \qquad \text{Expression (2)}$$

In addition, in order to satisfy total internal reflection conditions, it is necessary for the light beam C to satisfy the following expression.

$$2\theta - \arcsin[\sin(\phi/2)/n] < \arcsin[1/n] \qquad \text{Expression (3)}$$

n represents a refractive index of a substrate. A typical refractive index n is approximately 1.5 to 2.0, and in a case of displaying an image with an angle of view φ of approximately 20° to 50°, an inclination angle θ between the incident plane 130 and the emission/reflection plane group 133 becomes a range of 20° to 40°.

It is necessary to satisfy the same conditions in the second light guide plate, and an inclination angle θ between the incident plane 140 and the emission/reflection plane group 143 becomes a range of 20° to 40°.

Figure 9B:
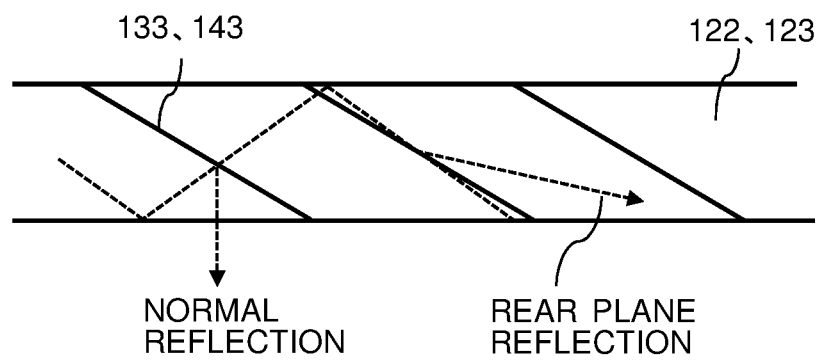
FIG. 9B is a view for describing a detailed configuration of the first light guide plate and the second light guide plate and an optical path in Example 1.

FIG. 9B is a schematic view illustrating an incidence and reflection state of a light beam to and from reflection planes within the first light guide plate 122 and the second light guide plate 123. In FIG. 9B, in the first light guide plate 122 and the second light guide plate 123, image light with a predetermined angle of view is incident to an emission plane group within a predetermined angle range, and is output to the outside of the light guide plates (normal reflection). On the other hand, since the light beam is confined within the light guide plates, a state in which the light beam is incident from a rear plane of the emission/reflection plane groups 133 and 143 and reflected light occurs (rear plane reflection) occurs. The rear plane reflection is unnecessary reflection and causes occurrence of stray light and a deterioration of efficiency.

From geometric arrangement, a range of an incident angle to the reflection planes of the emission/reflection plane groups 133 and 143 is $\theta \pm \arcsin[\sin(\phi/2)/n]$ in the normal reflection, and is $3\theta \pm \arcsin[\sin(\phi/2)/n]$ in the rear plane reflection. Typically, there is a difference in a refractive index between reflection films which constitute partial reflection planes and the material of the light guide plate, and thus the rear plane reflection rapidly increases as an incident angle θb approaches 90°. Therefore, in all image light beams, it is necessary for Ob to be set to 90° or less, preferably 86° or less, and more preferably 83° or less. Accordingly, it is necessary to satisfy at least the following Expression (4).

$$3\theta + \arcsin[\sin(\phi/2)/n] < 90° \quad \text{Expression (4)}$$

Next, description will be given of the see-through property of the second light guide plate 123. In FIG. 8B, a light beam 400 represents an external light beam that is transmitted from the emission/reflection plane group 143 of the second light guide plate 123 and is incident to the pupil 20, and an example in which the external light beam 400 is incident to emission/reflection plane V1 of the emission/reflection plane group 143 is illustrated.

The external light beam 400 is classified into an optical path along which the external light beam 400 is transmitted through the emission/reflection plane V1 and reaches the pupil 20, and an optical path along which the external light beam 400 is reflected from the emission/reflection plane V1, is reflected from an adjacent emission/reflection plane V2, and reaches the pupil 20. The quantity of light that is transmitted from the emission/reflection plane V1 and reaches the pupil 20 is set as I1, and the quantity of light that is reflected from an adjacent emission/reflection plane V2 and reaches the pupil 20 is set as I2.

In a case where the quantities of light I1 and I2 are approximately the same as each other, since the external light is divided by the emission/reflection plane group 143, there is a problem that the outside looks double to a user.

Therefore, it is necessary to make the quantity of light I1 be sufficiently smaller than the quantity of light I2. When the quantity of light of the external light beam 400 is set as I0, a reflectance of the emission/reflection plane V1 is set as r1, and the reflectance of the emission/reflection plane V2 is set as r2, a relationship of $I1=(1-r1) \times I0$, and a relationship of $I2=r1 \times r2 \times I0$ are satisfied. When contrast C of the divided light is defined as $C=I1/I2$, a relationship of $C=(1-r1)/r1 \times r2$ is satisfied.

In order for the user not to visually recognize a double image, the quantity of light I2 is preferably set to 1/100 or less times the quantity of light I1, and more preferably 1/150 or less times. That is, the contrast C is preferably set to 100 or more, and more preferably 150 or more.

It is assumed a case where all of the emission/reflection planes in the emission/reflection plane group 143 are set to the same film in order to reduce the manufacturing cost by processing the planes in the same film formation process. At this time, it is assumed that the reflectance of the emission/reflection plane group 143 is the same in each case, and the reflectance is r. The contrast C satisfies a relationship of $C=(1-r)/r^2$. From the viewpoint of the visibility of the above-described double image, since the contrast C is preferably 100 or greater and more preferably 150 or greater, the reflectance r is preferably 10% or less, and more preferably 8% or less.

As described above, according to this example, it is possible to provide an HMD using a light guide plate capable of displaying an image with a wider angle of view and an image without color unevenness while realizing a reduction in thickness, size, and weight.

Example 2

Figure 10:
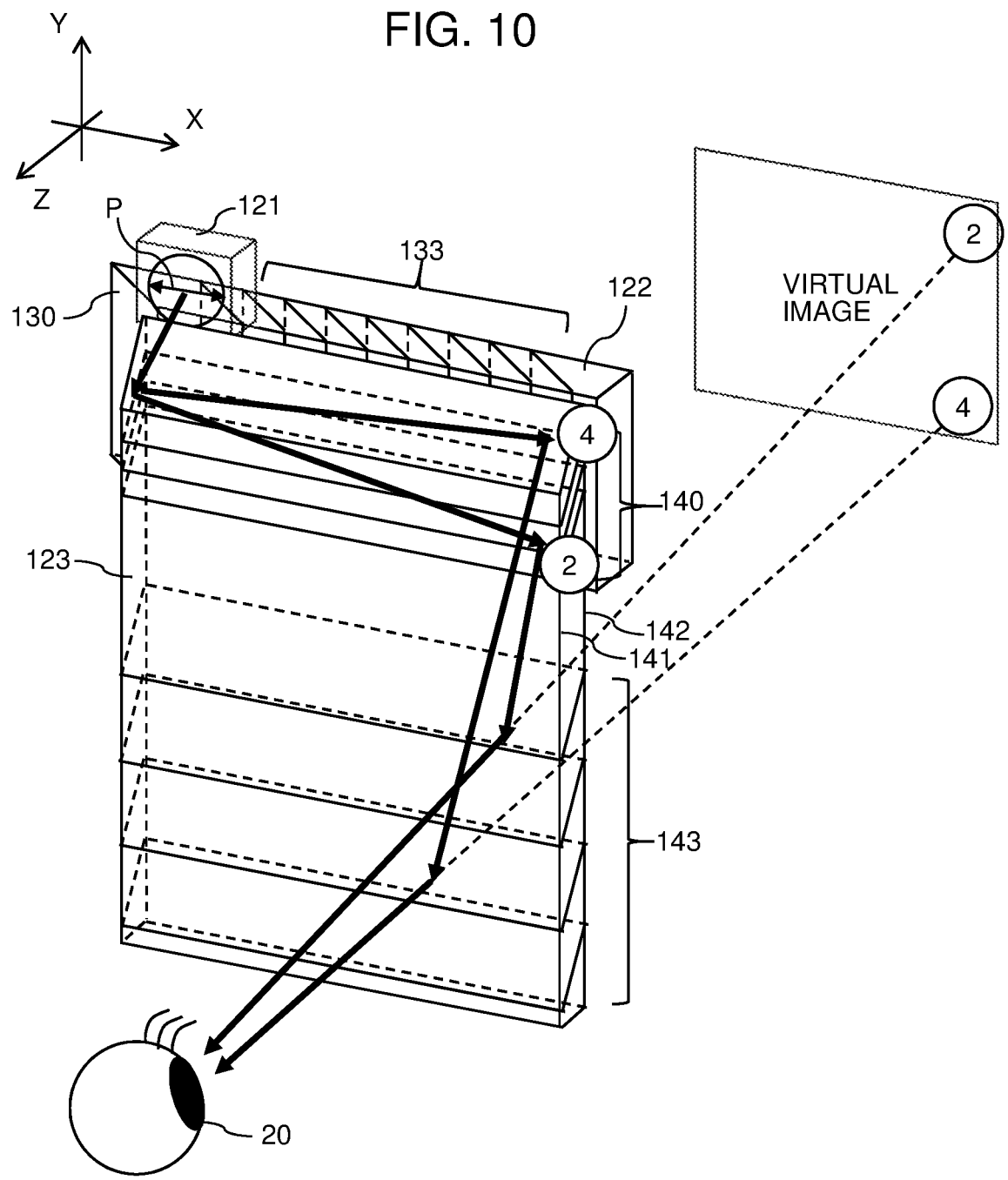
FIG. 10 is a configuration diagram of a first light guide plate and a second light guide plate in Example 2.

FIG. 10 is a configuration diagram of a light guide plate in this example. In FIG. 10, the same reference numeral will be given to the same configuration as in FIG. 4, and description thereof will be omitted. FIG. 10 is different form FIG. 4 in that the incident planes 140 of the second light guide plate 123 is constituted by a plurality of input/reflection planes.

As an example, FIG. 10 illustrates optical paths of an angle-of-view position 2 and an angle-of-view position 4 on a right side of an angle of view through which light is incident to the second light guide plate 123 from an emission/reflection plane farther from the incident plane 130 of the first light guide plate 122, and propagates to the pupil 20. When the incident plane 140 of the second light guide plate 123 which couples image light transmitted from the first light guide plate 122 does not have a predetermined width, the image light cannot be received. When the predetermined width is not secured, there is a problem that it is difficult to receive image light, particularly, at the angle-of-view position 2 and the angle-of-view position 4, it is difficult to display partial images of the angle-of-view position 2 and the angle-of-view position 4, or partial luminance of the angle-of-view position 2 and the angle-of-view position 4 decreases. Particularly, when a display image is set to have a wide angle of view, the problem becomes significant.

However, in a case where the light guide plate is made to be thick to increase an area of the incident plane 140 of the second light guide plate, since total internal reflection interval of image light confined at the inside becomes broad, an emission interval of duplicated image light becomes broad, and thus luminance unevenness occurs. In addition, an increase in weight and manufacturing cost due to an increase in thickness also occurs.

Therefore, as a method of raising coupling efficiency of image light transmitted from the first light guide plate 122 without increasing the thickness of the second light guide plate 123, there is a method in which the incident plane 140 is constituted by a plurality of reflection planes. When a plurality of sheets of incident planes are formed, it is possible to increase an effective area of the incident plane without increasing the thickness.

Figure 11:
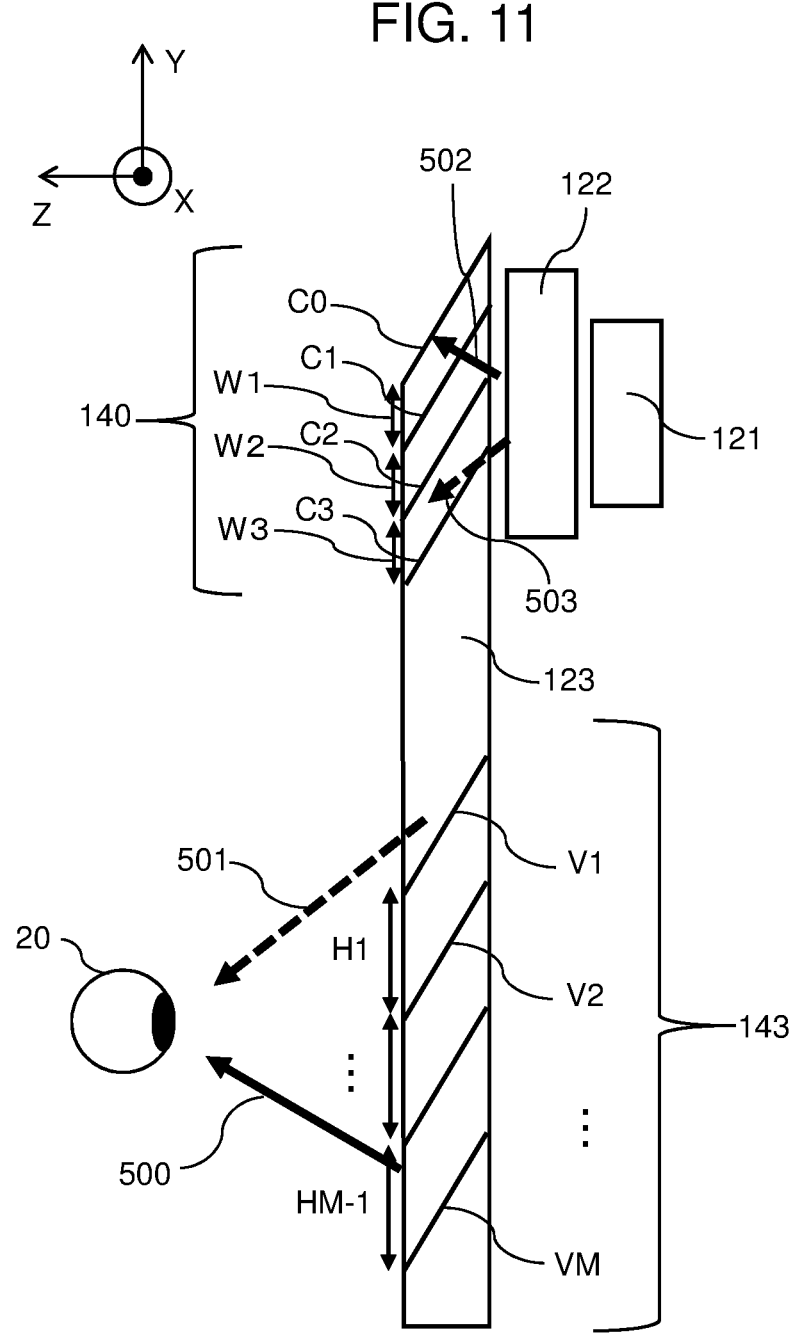
FIG. 11 is a view for describing a configuration of the second light guide plate in Example 2.

FIG. 11 illustrates the light guide plate in this example from a horizontal direction of the X-axis. In FIG. 11, the incident plane 140 of the second light guide plate 123 are constituted by four sheets of input/reflection planes, and the four sheets of input/reflection planes are set as C0 to C3 from a side farther from the emission/reflection plane group 143 (output part). In addition, intervals of the input/reflection planes are set as W1 to W3 from a side farther from the emission/reflection plane group 143 (output part).

It is preferable that the plurality of input/reflection planes C0 to C3 are parallel to each other to maintain image quality of the image light.

In addition, it is necessary for the image light reflected from the input/reflection plane C0 to be transmitted through the input/reflection plane C1, the input/reflection plane C2, and the input/reflection plane C3. Accordingly, the input/reflection plane C0 may be set to have a high reflectance close to 100% to raise coupling efficiency of the image light transmitted from the first light guide plate 122.

In addition, in the plurality of input/reflection planes C0 to C3, when a reflectance is set to be lower as approaching the emission/reflection plane group 143 (output part) of the second light guide plate 123, it is possible to reduce luminance unevenness in an image which occurs when the image light transmitted from the first light guide plate 122 is coupled to the second light guide plate.

In addition, the color unevenness that occurs due to absorption in the second light guide plate 123 can be reduced by wavelength dependency of the reflectance of the plurality of input/reflection planes. In FIG. 11, an optical path along which light on a lower side of an angle of view is incident to the pupil 20 is indicated by an arrow 500, and an optical path along which light on an upper side of the angle of view is incident to the pupil 20 is indicated by a dotted arrow 501. In addition, an optical path when light on a lower side of the angle of view is coupled to the second light guide plate 123 from the first light guide plate 122 is indicated by an arrow 502, and an optical path when light on a lower side of the angle of view is coupled to the second light guide plate 123 from the first light guide plate 122 is indicated by a dotted arrow 503.

As illustrated in FIG. 11, the optical path in propagation through the second light guide plate is longer on the lower side of the angle of view in comparison to the upper side of the angle of view. Therefore, the image light on the lower side of the angle of view is greatly influenced due to absorption of the blue wavelength region by the material of the light guide plate, and emission efficiency of the blue wavelength side deteriorates, and color unevenness occurs.

When being coupled to the second light guide plate from the first light guide plate, the image light on the lower side of the image of angle is coupled on an input/reflection plane farther from the emission/reflection plane group 143 (output part) among the plurality of input/reflection planes. Accordingly, when at least the reflectance of the blue wavelength region of an input/reflection plane (C0 in FIG. 11) farthest from the emission/reflection plane group 143 (output part) among the plurality of input/reflection planes is set to be higher than the reflectance of the green wavelength region and the red wavelength region, in the image light on a lower side of the angle of view, emission efficiency on the blue wavelength side is improved, and the color unevenness can be reduced.

More preferably, in the input/reflection plane farthest from the output part of the second light guide plate, when the reflectance of the blue wavelength region is set to be higher than the reflectance of the green wavelength region and the red wavelength region in comparison to the input/reflection plane immediately before the farthest input/reflection plane, the color unevenness can be improved.

In addition, in a case where the reflectance of the blue wavelength region is set to be higher than the reflectance of the green wavelength region and the red wavelength region in two or more input/reflection plane, a ratio of the reflectance of the blue wavelength region and the reflectance of the red wavelength region, that is, (the reflectance of the blue wavelength region)/(the reflectance of the red wavelength region) is set to be larger as the input/reflection plane is farther from the output part, and thus the color unevenness that increases in accordance with light propagation can be improved.

In addition, in a case where the intervals W1 to W3 of adjacent reflection planes in the plurality of input/reflection planes are wider than the optical diameter P of the projection unit 121, overlapping adjacent duplicated image light beams becomes insufficient, and thus an eye-box region in which the quantity of image light is less occurs. Therefore, when the intervals W1 to W3 of the adjacent reflection planes is set to be smaller than the optical diameter P of the projection unit 121, luminance uniformity within the eye-box or a visually recognized image is improved.

As described above, according to the configuration illustrated in this example, even in a case where image light with a wide angle of view is incident, an image with high quality can be displayed by enlarging the eye-box while suppressing an increase in size of the light guide plate.

Figure 12:
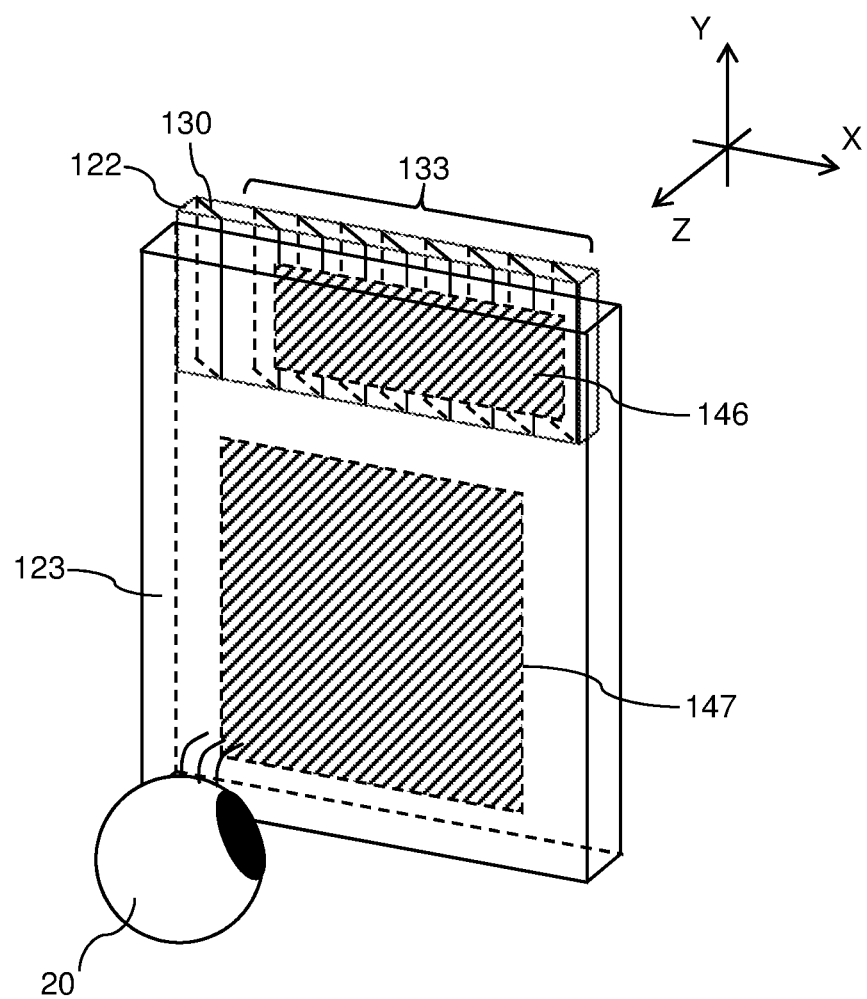
FIG. 12 is a view for describing a modification example of the second light guide plate in Example 2.

Not that, hereinbefore, description has been given of a configuration in which the emission/reflection plane group is used in the first light guide plate 122 and the second light guide plate 123, but the eye-box may be enlarged by a light guide plate that uses another method. For example, FIG. 12 illustrates an example of a light guide plate that uses a diffraction grating or a volume hologram in the second light guide plate. In FIG. 12, an input part 146 is provided in the second light guide plate 123 instead of the incident plane 140. The input part 146 is a surface relief diffraction grating or volume hologram, deflects a propagation direction of input image light, and guides the image light to the inside of the light guide plate. Similarly, the surface relief diffraction grating or volume hologram is formed in an output part 147 to deflect a part of the image light propagated through the inside of the light guide plate to the pupil 20, thereby realizing image display while enlarging the eye-box. The surface relief diffraction grating or volume hologram of the output part 147 is designed to reduce diffraction efficiency with respect to external light, and thus the second light guide plate has the see-through property.

Example 3

Figure 13:
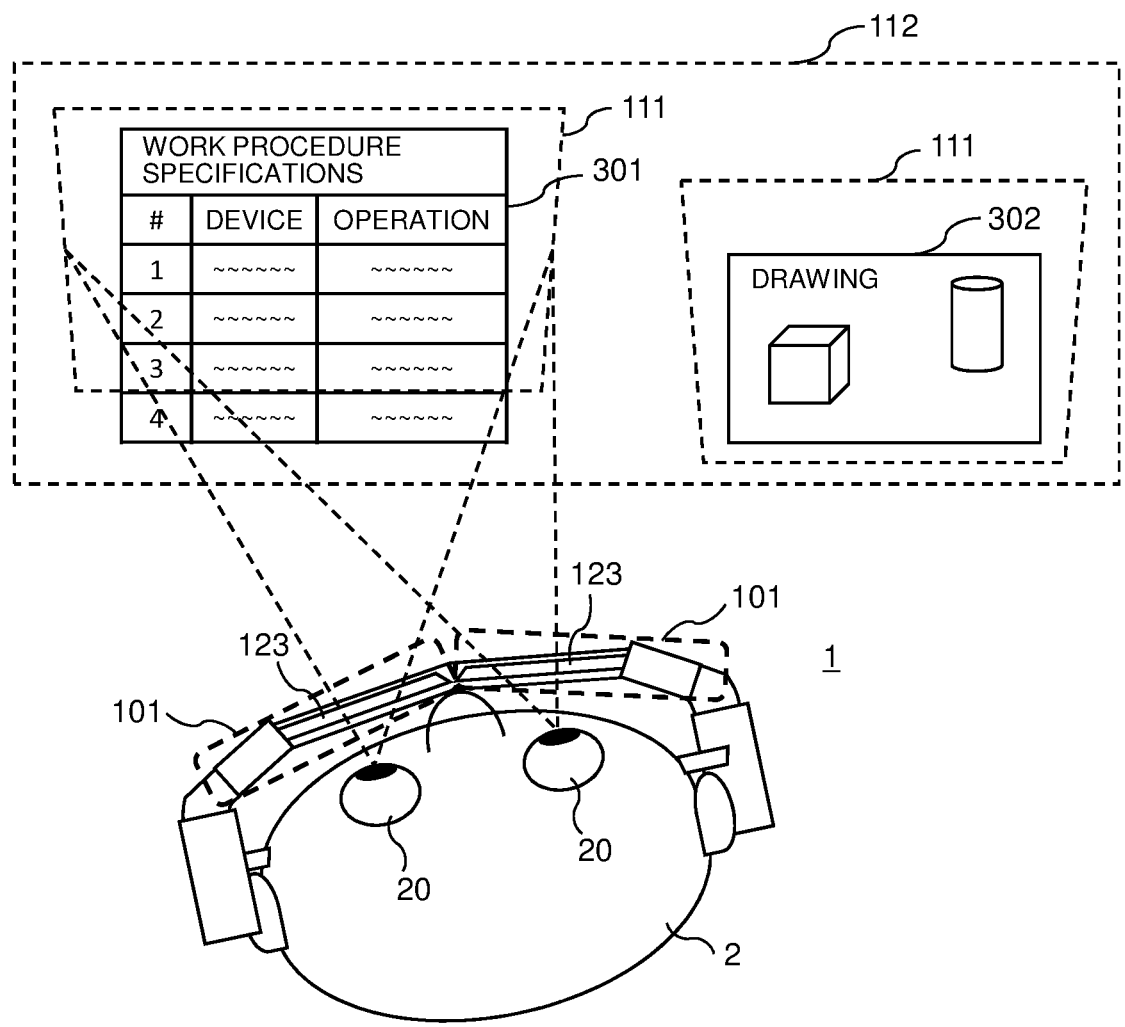
FIG. 13 is a view illustrating a usage example of an HMD in Example 3.

In this example, description will be given of an application example of the HMD described in Examples 1 and 2. FIG. 13 is a view illustrating a usage example of an HMD in this example.

In FIG. 13, within a field of view of a user 2, contents are displayed in an image (virtual image) display region 111 from the HMD 1. For example, a work procedure specification 301 or a drawing 302 is displayed in inspection, assembly, or the like of an industrial device. Since the image display region 111 is limited, when the work procedure specification 301 and the drawing 302 are simultaneously displayed, contents are reduced, and thus visibility deteriorates. Therefore, head tracking in which a direction of the head of the user 2 is detected by an acceleration sensor is performed, and a display content is changed in correspondence with the direction of the head to improve the visibility. That is, in FIG. 13, the work procedure specification 301 is displayed in the image display region 111 in a state in which the user 2 faces the left, and when the user faces the right, the drawing 302 is displayed in the image display region 111. Accordingly, display can be performed as if a virtual image display region 112 capable of visually recognizing the work procedure specification 301 and the drawing 302 in a wide visual field exists.

According to this, the visibility is improved, and the user 2 can perform a work while simultaneously visually recognizing a work target (a device, a tool, or the like) and a work instruction, and thus the work can be performed in a more reliable manner, and thus a mistake can be reduced.

Figure 14:
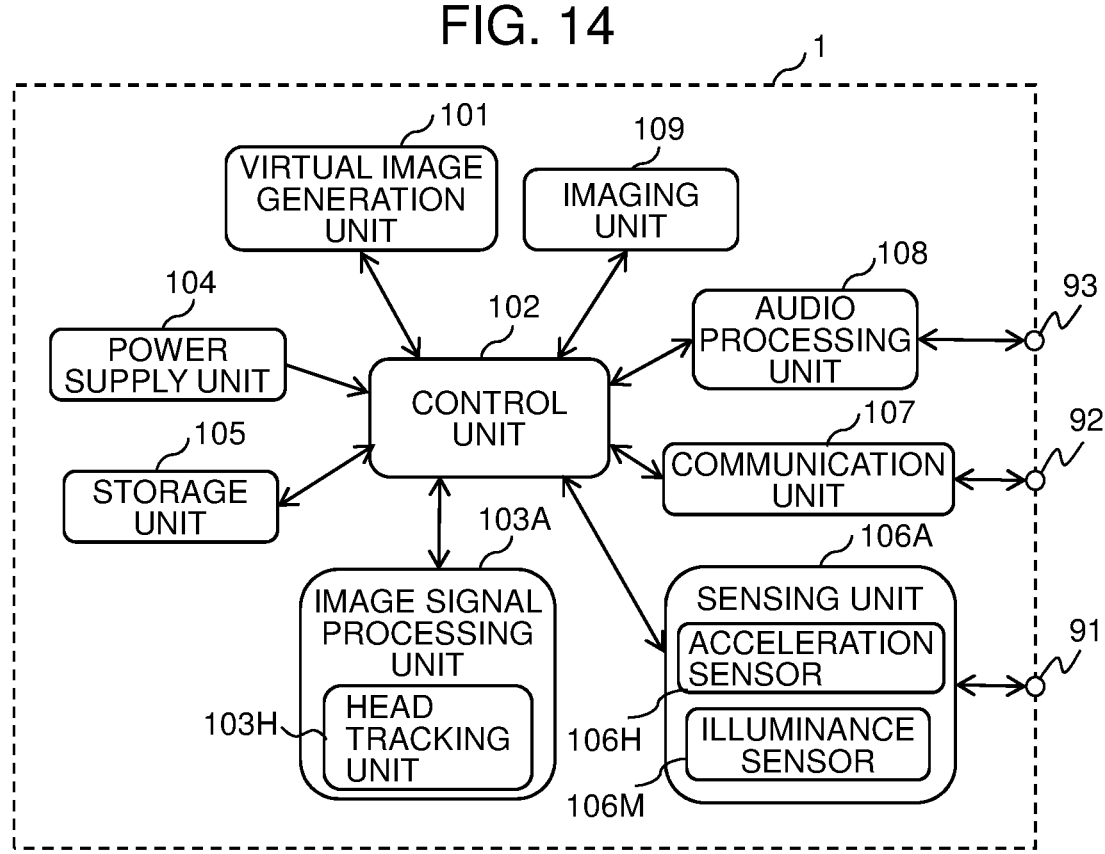
FIG. 14 is a functional block configuration diagram of an HMD in Example 3.

FIG. 14 is a functional block configuration diagram of the HMD in this example. In FIG. 14, the same reference numeral will be given to the same configuration as in FIG. 1, and description thereof will be omitted. FIG. 14 is different from FIG. 1 particularly in that a head tracking function is added. That is, a head tracking unit 103H is provided in an image signal processing unit 103A of the HMD 1. The head tracking unit 103H detects a direction of the head of the user 2 on the basis of information obtained by an acceleration sensor 106H in a sensing unit 106A, and changes a display content in correspondence with the direction of the head.

In addition, the HMD is used indoors. Accordingly, it is necessary to adjust luminance of a display image in correspondence with the brightness of an ambient environment. As an example, an illuminance sensor 106M is mounted in the sensing unit 106A, and luminance of an image that is displayed by the image signal processing unit 103A may be adjusted in correspondence with an output of the illuminance sensor.

Hereinbefore, description has been given of the examples, but the invention provides an HMD capable of displaying an image with a wider angle of view and an image without color unevenness while realizing a reduction in thickness, size, and weight, and thus the amount of processing materials can be reduced. Accordingly, carbon emission is reduced and global warming is prevented, and the invention particularly contributes to energy of Item 7 for realizing sustainable development goals (SDGs).

In addition, the invention is not limited to the above-described examples, and includes various modification examples. For example, the functional configuration of the HMD and the virtual image generation unit are classified in correspondence with main processing contents for easy comprehension. The invention is not limited by a classification method or the name of constituent elements. The configuration of the HMD and the virtual image generation unit can also be classified into a large number of constituent elements in correspondence with processing contents. In addition, classification can be made so that one constituent element executes more processes.

In addition, it is not needless to say that the invention is applicable to not only the HMD but also other image (virtual image) display devices having the configuration of the virtual image generation unit described in each example in a similar manner.

In addition, a part of the configuration in an example can be substituted with other a configuration of another example. In addition, a configuration of another example can also be added to a configuration of an example. In addition, addition, deletion, or substitution of another configuration to a part of the configuration in each example is also possible.

What is claimed is:

1. A head-mounted display configured to displays an image in a visual field of a user, comprising:
   an image display unit configured to generate an image to be displayed; and
   a first light guide plate and a second light guide plate configured to duplicate image light from the image display unit,
   wherein each of the first light guide plate and the second light guide plate includes a set of parallel main surfaces confining the image light with internal reflection,
   the first light guide plate includes an incident plane that reflects the image light to an inner side, and two or more emission/reflection planes from which the image light is emitted to the second light guide plate,
   the second light guide plate includes an input part that couples the image light transmitted from the first light guide plate to the inner side, and an output part from which the image light is emitted to a user's pupil, and
   a reflectance of blue wavelength region in an emission/reflection plane farthest from the incident plane of the first light guide plate is higher than a reflectance in a green wavelength region and a red wavelength region.

2. The head-mounted display according to claim 1, wherein in the emission/reflection plane farthest from the incident plane of the first light guide plate in which the reflectance of the blue wavelength region is higher than the reflectance of the green wavelength region and the red wavelength region,
   the reflectance of the blue wavelength region is within a range of 1.0 to 2.0 times the reflectance of the red wavelength region.

3. The head-mounted display according to claim 1, wherein in the two or more emission/reflection planes of the first light guide plate, the reflectance of the blue wavelength region is higher than the reflectance of the green wavelength region and the red wavelength region.

4. The head-mounted display according to claim 1, wherein in the two or more emission/reflection planes of the first light guide plate, a ratio of the reflectance of the blue wavelength region and the reflectance of the red wavelength region is increased as being farther from the incident plane.

5. The head-mounted display according to claim 1, wherein in the emission/reflection plane farthest from the incident plane of the first light guide plate in which the reflectance of the blue wavelength region is higher than the reflectance of the green wavelength region and the red wavelength region,
   a reflectance of the emission/reflection plane farthest from the incident plane of the first light guide plate has wavelength dependency satisfying a relationship of (the reflectance of the blue wavelength region)>(the reflectance of the green wavelength region)>(the reflectance of the red wavelength region).

6. The head-mounted display according to claim 1, further comprising:
   a projection unit configured to enlarge the image light from the image display unit and projects the enlarged image light to the first light guide plate,
   wherein plane intervals of the two or more emission/reflection planes of the first light guide plate are smaller than an optical diameter of the projection unit.

7. The head-mounted display according to claim 1, wherein the incident plane of the first light guide plate, and the two or more emission/reflection planes are parallel to each other, and have different angles from the set of parallel main surfaces.

8. The head-mounted display according to claim 1,
wherein an inclination angle of the two or more emission/reflection planes with respect to the set of parallel main surfaces of the first light guide plate is a predetermined angle θ, and
the predetermined angle θ is within a range of 20° to 40°.

9. The head-mounted display according to claim 1,
wherein a reflectance of the two or more emission/reflection planes of the first light guide plate is higher as being farther from the incident plane.

10. The head-mounted display according to claim 1,
wherein the output part of the second light guide plate includes two or more partial reflection planes.

11. The head-mounted display according to claim 10,
wherein a reflectance of the two or more partial reflection planes is 10% or less.

12. The head-mounted display according to claim 1,
wherein the input part of the second light guide plate includes two or more input/reflection planes.

13. The head-mounted display according to claim 12,
wherein a reflectance of the two or more input/reflection planes becomes lower as being close to the output part of the second light guide plate.

14. The head-mounted display according to claim 12,
wherein in an input/reflection plane farthest from the output part of the two or more input/reflection planes, the reflectance of the blue wavelength region is higher than the reflectance of the green wavelength region and the red wavelength region.

15. The head-mounted display according to claim 1,
wherein the second light guide plate is a light guide plate including a diffraction grating or a volume hologram.

16. The head-mounted display according to claim 1, further comprising:
a power supply unit configured to supply power;
a sensing unit configured to detect a position or a posture of the user;
an audio processing unit configured to perform input or output of an audio signal; and
a control unit configured to perform control of the power supply unit, the sensing unit, and the audio processing unit.

17. The head-mounted display according to claim 1, further comprising:
an acceleration sensor configured to detect a movement of a head of the user;
a head tracking unit configured to changes a display content in correspondence with the movement of the head of the user which is detected by the acceleration sensor;
a power supply unit configured to supply power;
an audio processing unit configured to perform input or output of an audio signal; and
a control unit configured to control the acceleration sensor, the head tracking unit, the power supply unit, and the audio processing unit.

* * * * *